Feb. 5, 1957 S. BERKMAN 2,780,602
COMPOSITIONS FOR IMPROVING COMBUSTION
IN AN INTERNAL COMBUSTION ENGINE
Filed Nov. 30, 1951

INVENTOR.
Sophia Berkman
BY
Duell & Kane
ATTORNEYS

United States Patent Office 2,780,602
Patented Feb. 5, 1957

2,780,602

COMPOSITIONS FOR IMPROVING COMBUSTION IN AN INTERNAL COMBUSTION ENGINE

Sophia Berkman, New York, N. Y., assignor to Transonic Corporation, New York, N. Y., a corporation of Delaware Application November 30, 1951, Serial No. 259,127

4 Claims. (Cl. 252—432)

This invention relates to means for improving combustion, and more particularly to means for improving combustion in an internal combustion engine.

An object of this invention is the provision of a catalytic material in the form of heterogeneous mineral complexes embedded in or secured to the inner side wall within the combustion chamber presenting a catalytic surface exposed to the reactions involved in internal combustion.

A further object of this invention is the provision that the said heterogeneous mineral complex catalyst comprises minerals providing catalytic action with respect to single superimposed reactions (decomposition, dehydrogenation-oxidation) of the combustion process as well as those acting in terms of the carbonium ion mechanism and some as regular antiknocks.

A further object of this invention is the provision that certain mineral components of the catalytic heterogeneous mineral complexes serve as catalysts with respect to specific types in the diversity of hydrocarbons of the fuel.

A still further object of this invention is the provision of controlled and normalized internal combustion of fuel achieved through the multiplicity of action of catalysts of the type of heterogeneous mineral complexes which in turn provides proper balancing of equilibria in catalytic reactions characteristic for the process of internal combustion.

A still further object of this invention is the provision of a special type of a catalyst in the form of heterogeneous mineral complexes capable of withstanding drastic physical conditions prevailing in an internal combustion engine. The heterogeneous mineral complexes in accordance with this invention comprise mineral ingredients serving as binders and hardening agents, bringing about strong chemical linkages, cross bindings through specific radicals. Certain integral parts of mineral complexes improve coherence within and others provide adherence to the surface to which applied within the combustion chamber.

A still further object of this invention is the provision of synthetically compounded rock-like catalytic material which, when applied to the surface of the piston and/or cylinder head or/and any other surface within the combustion chamber, hardens to a heat resistant, porous, non-shatterable and rather oil- and water-proof surface. It is preferable to apply and harden the novel catalytic material within a plurality of apertures or grooves, formed in the inner face of each individual part of the engine, these grooves or apertures being inwardly flared to provide positive means for locking the catalyst in place.

Further objectives embodied in this invention are to provide (1) means for improving and normalizing combustion within the cylinder of a gasoline engine to the extent that a reduced tendency to knock is achieved, even though the engine may be of a type having a high compression ratio, (2) the provision of means in association with the engine which will raise the apparent octane number of the fuel employed in the engine, (3) provision of readily formed and installed catalytic surface in the gasoline engine resulting in an improvement in operation with respect to detonation characteristics of the fuel combusted in the engine, and (4) provision of simple means through the catalyst used for improving the operating characteristics of an internal combustion engine such as effecting absence of preignition and carbonization.

*Essential aspects of the internal combustion process*

Combustion of fuels in the internal combustion engine is of a complex nature. This is true because phenomena occurring in the engine are a function of numerous factors: (1) Fuels undergoing combustion are according to their various specifications composed of a variety of hydrocarbons differing in their behavior. (2) The combustion process in itself of a diversity of hydrocarbons consists not of a single reaction, but represents several superimposed reactions, occurring in a comparatively short interval of time. (3) Drastic physical conditions and changes to which the hydrocarbons are subjected within the internal combustion engine are of a nature counteracting normal, slow and steady combustion. (4) Combustion in an internal combustion engine is accompanied usually by detonation-knocking, occurring during the power stroke lasting infinitely small periods of time and functioning as destructive impacts in the engine. (5) Detonation bears direct relationship to the temperature of the charge immediately before ignition as well as the temperature of the last portion burned. The higher the temperature, the greater the tendency to detonate and the greater the depreciation. Relationship between temperature, pressure and speed of flame propagation in adiabatic combustion determines whether the type of combustion is normal or abnormal. (6) Fuels under proper conditions are inclined to preignition, although preignition and detonation do not always go hand in hand. Ionization occurring prior to ignition is very important for the kind of combustion. Knocking fuels are little ionized. The tenedncy to knock increases as the degree of ionization of fuel-air mixture, before ignition, decreases. (7) The rate and steadiness of combustion influence the completeness of combustion and therefore determine the efficiency of combustion and the performance of an engine in sense of power liberated, etc.

*Detonation phenomenon and mechanisms of knocking*

In overcoming difficulties in regulating advantageously the internal combustion process, most of the attention has been given to the detonation phenomenon, since it is almost unavoidable in any internal combustion process. Various mechanisms by which knocking occurs have been advocated to serve as the most plausible explanation of the phenomenon and thus to help in the solution of how to eliminate it.

When combustion first takes place it produces a rise in temperature and in pressure in the internal combustion chamber. This rise takes place before all of the fuel is consumed. Just as soon as this temperature gets above the flash point of the fuel, the whole remaining mass burns almost instantaneously. This in turn produces a very rapid increase in pressure sufficient to produce the characteristic knock. This theory of Ricardo presumes that fuel is inclined to pre-ignition under conditions of detonation. However, some fuels which detonate badly do not pre-ignite readily, while others that pre-ignite easily show no tendency whatsoever to detonate. For example, kerosene detonates badly, but shows no great tendency to pre-ignition.

The detonation wave theory postulated that after ignition took place, the propagation of the flame, slow at first, increases in the velocity with rise in temperature.

The acceleration continues until detonation velocity is achieved, accompanied by an increase in pressure. The expansion becomes prevented thereby to the point of a sudden compression wave, the high velocity together with the impact on the cylinder walls resulting in knock.

The wave theory accounts for the fact that T-head or L-head cylinders are more liable to produce detonation than the I-head type. In the latter the distance through which combustion proceeds is shorter than in the former types, so that there is no such opportunity for a very high velocity to be attained. Detonation as well as spontaneous ignition have both been explained by compression waves which could be controlled if one could become independent of the nature of fuel. Dixon and Ostwald (W) postulated that resolving super-compression into a number of separate stages would prevent knocking. It is true that detonation recorded photographically by characteristic discontinuities produced by the liability of hydrocarbons to knock and the appearance of discontinuities in the path of explosion waves served as criteria in the understanding of the mechanism of action of detonation.

According to Perrin's radiation theory detonation results when a portion of the mass of the fuel/air mixture is activated by radiations sent ahead by a flame. However, a wave of radiant heat may pass through part of the mixture without raising its temperature. The denser the mixture of vapors, the less readily the radiant heat will pass through and the more of it will be absorbed by them. The absorption of radiation will decompose the hydrocarbons composing the vapors of gasoline (lighter hydrocarbons, carbon and hydrogen). The hydrocarbons and hydrogen will ignite and burn with great rapidity and knock be produced by a pressure wave resulting from the sudden combustion.

Lind compared the detonation phenomenon in the internal combustion engine with the velocity of interaction of $H_2$ and $O_2$ under the influence of alpha particles. Similarity lies in the departure from the equivalent mixture in the direction of an excess of hydrogen (lower density), lowering the velocity, while the shift in sense of an excess of oxygen (higher density) increases the velocity.

The molecular collision theory of detonation assumed that undecomposed hydrocarbon fuel molecules present immediately in the front of an explosion wave are bombarded by swiftly moving molecules of oxygen, hydrogen, carbon monoxide from the explosion wave itself. The controlling factor of the reaction depends upon the relative number of the bombarding molecules.

Wendt & Grimm postulated that detonation occurs because the explosive flame is propogated by the emission of electrons from the reacting molecules which cause detonation at high temperatures and pressures. However, magnetic and electrostatic fields failed to reduce the rate of combustion as would have been expected according to this hypothesis.

Knock has been considered (Brown & Watkins) as caused by a heterogeneous reaction on hot surfaces in the combustion chamber of an engine. The rise of pressure in a progressive homogeneous reaction increased with molecular weight in the paraffin series and varied inversely with the number of methyl groups added in the benzene rings. However, the rate of rise of pressure in homogeneous reactions is not the sole factor determining knock. The two other chief factors determining the tendency of fuels to knock were considered to be: (1) the rate of of rise of pressure, and (2) auto-ignition temperature. Auto-ignition of unburned mixture adiabatically compressed against hot surfaces is one of the mechanisms causing fuel to knock. Spontaneous ignition temperature, the limit of inflammability of fuel and the velocity of propagation of combustion and knocking is not due to pre-ignition, since the latter depends on a vibratory type of combustion not on detonation.

Withrow and Boyd thought the phenomenon of knock is due to a manifold increase in the rate of inflammation of the last portion of the charge and that the intensity of this afterglow increases as the pressure rises.

According to G. Dicks production of knock results from the fact that when the compression temperature is below the spontaneous ignition temperature of the fuel, the combustion mixture formed manifests a too rapid burning. When on the contrary, the compression temperature is sufficiently high at the time the injected fuel begins to vaporize then the fuel burns as fast as it vaporizes and an orderly combustion is effected.

Knocking, being the result of auto-ignition in the last part of the charge to burn, may be due to insufficient time for completing physical or chemical changes causing self-ignition before the flame front passes through the mixture of hydrocarbons and consumes it. Self-ignition is reached with a certain compression ratio at which no knocking takes place (Taylor, E. S.).

The nuclear drop theory of self-ignition has been advocated by Callendar to explain the occurrence of detonation. The liquid hydrocarbon fuels containing some proportion of high boiling points constituents, liquid drops of higher boiling fractions remain after evaporation of the lighter fractions of the fuel. On compression, these residual drops as they evaporate will recondense in part and remain within as nearly pure vapor. These residual drops have a lower ignition temperature than the gaseous mixture in which they are dispersed. Should the end gas be impregnated with these liquid drops nearly simultaneous ignition-detonation will occur prior to the completion of the combustion. In this respect carbon nuclei-smoke particles remaining in the cylinder from previous combustion of hydrocarbons would promote formation of liquid drops in a completely vaporized mixture and serve as foci of condensation. However, the nuclear drop theory of detonation failed to account for detonation in completely vaporized mixtures. To provide an igniting effect a sufficient concentration of the drops in the end gas must be present. Some product of oxidation of the rich mixture surrounding the slowly evaporating drops may be readily inflammable and ignite the drops.

It was King's, R. O., opinion that, should the unburned mixture of hydrocarbons ahead of the flame be subjected to pyrolysis and oxidation on the contact surface simultaneously, then the carbon particles formed by pyrolysis may substitute the liquid drop nuclear theory proposed by Callendar.

There is a close relation between engine knock and the rapidity of occurrence of explosion reactions. Increasing pressure, raising temperature, approaching a theoretical amount of oxygen or air/fuel ratio all increases not only preoxidation, but hastens the occurrence of the type of combustion resulting in knocking phenomena and so Prettre considered the existence of a close relationship between spontaneous oxidation of fuel mixtures and the tendency to knock.

Newitt reasoned that in an adiabatic combustion pressure reaches a maximum before the end of the combustion on account of the heat losses to the walls by radiation. In motors this pressure drops toward the end of combustion and this leads to a backward movement of the unburned gas into the flame and a mixing of burned and fresh gas occurs. As a result a finite amount of fresh air/fuel mixture can be sensitized and start thereby a violent knocking combustion.

Röchling thought the dominating factor in the knock mechanism to be the combustion velocity and this in turn being linked to a resonance effect in the knocking vibration.

Isogai presumed that the origin of knocking on combustion of hydrocarbons may be in the vibrations of a steady flame which is capable of producing active oxygens accelerating the combustion and thereby bringing about knocking. Miller claimed that he actually recorded by high speed motion pictures a gradual build up of reflected pressure waves prior to the occurrence of knock. Knock is a sudden explosion in the end gas zone, which occurs within less than 50 microseconds and is usually preceded by exothermic reactions also in the end zone which have a duration of 600 microseconds according to findings by Rothrock, Spencer & Miller. On the other hand in the knocking process initial ignition at one or more points is usually followed by a flame propagation of such a high velocity that detonation is actually caused. However, an extremely rapid sudden rise in temperature and pressure of the residual gases in the initial process is not sufficient to account for the high velocity and it may be mostly due to chain reactions. Long straight chain hydrocarbons facilitate greatly the occurrence of chain reactions, while ring compounds or structurally branched compounds hinder chain reactions and likewise the detonation.

Masurkiewicz and Oberholzer considered high knock resistance to be determined by characteristics of molecular structure of hydrocarbons constituting the fuel such as (a) the increased branching of the chain, (b) the compactness of the structure of hydrocarbons constituting the fuel, and (c) the symmetry. On the other hand they thought that the chemical type of the fuel used with respect to its ability of forming a large number of free radicals and the time necessary for the formation of free radicals to coincide with the specific ignition delay, long enough to complete the combustion, were of great significance.

Turbulence in turn reduces knocking by decreasing the duration of the combustion process and prolongs the first stage of auto-ignition because of a better homogeneity.

The extent of heterogeneous oxidation reactions as well as the nature of products formed depends also on the degree of turbulence in the mixture, the nature and temperature of the contact surfaces and the type of the combustible mixture.

Boerlege, G. D., Broeze et al. pointed out that detonation causing a pressure disturbance may result in stationary waves throughout the entire gas mass in the engine, with the lowest frequency predominating. The amplitude of these waves being the function of the severity of detonation and of the design factors of the combustion chamber (size, shape, etc.). These investigators pointed out three typical regions where detonation is localized: (1) detonation corners, where the combustion of the end gas takes place, (2) corners where the vibrating pressure effect occurs and (3) place where the highest heat flow is directed toward the walls.

Ubbelohde's viewpoint on the problem of detonation has been that knocking occurs from the disruptive explosion of substances formed by preliminary and partial combustion in localized regions by a chain reaction. As main carriers in the combustion he specified alkyl hydroperoxides which rearrange to form an aldehyde and water and which can likewise decompose on timely and energetic collisions with chain branching, knocking or ignition.

In their hydroxylation theory of detonation Armstrong and also Bone linked knocking to the intermediate products of combustion. The intermediate products of combustion were identified as peroxides and found to possess an appreciable proknock effect. It has been observed that as the compression ratio is increased the peak in peroxide concentration becomes much higher. It is the collision between hydrocarbon fuel molecules and oxygen molecules that brings about the formation of organic peroxides having relatively high energy content. This reactivity is handed on from the peroxide to the new reactant molecules, the reaction being auto-catalytic in character. Thus, the peroxides formed during combustion are considered as primary oxidation products and supposed to furnish active centers for the subsequent oxidation of the hydrocarbon constituents of the gasoline fuel by a chain reaction mechanism.

Sudden variation in the kinetic properties of the hydrocarbon/air mixture during the very short delay period and the subsequent explosion wave has been considered to cause detonation. According to this hypothesis advanced by Eggerton, Smith, Ubbelohde, for detonation to occur a certain concentration of peroxides should be reached immediately before ignition of the last portion of the charge. The disappearance of detonation should then be not only the result of slowing down of the initial oxidation reaction, but also the result of degradation of the detonating properties of the fuel mixture as the result of a premature dissociation of peroxides. If the peroxidation hypothesis does not work, then the reaction chains may start from the aldehyde and proceed by an atomic chain mechanism, according to which, for example, methane should be oxidized by a chain reaction involving free radicals and atomic carbon. Oxidation of other chain reaction. Assumption by Norrish that thermal decomposition results in a replacement of one molecule of a hydrocarbon by several, with the result that increase in hydrocarbons may require atomic oxygen as a link in the concentration may greatly augment the rate of oxidation and increase thereby the knocking tendency, appears less satisfactory, if one considers that, as in the peroxidation hypothesis, the organic peroxides—the initial and unstable products of slow oxidation at relatively low temperatures—must persist and be essential links in chain reactions likewise at extremely high temperatures of the end gas.

Knocking has been viewed (Wilken-Jordan) as an accumulation and sudden liberation of energy which depends on the inherent tendency of the combustible hydrocarbons to form intermediate products extending thereby the duration of combustion and the tendency of such hydrocarbons to undergo a rather complete combustion first to CO and further to $CO_2$ and water.

Steel, S., explained detonation by the formation of free hydrogen from the fuel causing knocking. When different hydrocarbons of gasoline decompose as well as those compounds which are formed when gasoline has been heated in the presence of air, free hydrogen and carbon are liberated. Octanes and nonanes are especially apt to do this. One of the new compounds formed thereby may be acetylene and, if actually produced, may account for the knock. Both acetylene and hydrogen have, as known, a very high rate of combustion. Flame propagation rate for hydrogen is ten times that for gasoline/air mixtures and that for acetylene is about six times as rapid. Not only do they burn with this high velocity, but they may accelerate the rate of combustion for all other gases present in the combustion chamber.

*Control of detonation, antiknocks and mechanism of their action*

Attempts were made not only to interpret the type of mechanism involved in the detonation phenomenon but to find means by which to control it and maybe eliminate it to a greater extent. Detonation may be controlled by retarding the rate of combustion of fuel to the extent of slow, but steady burning or by adding chemical agents to the fuel/air mixture which would serve to increase the specific heat of its constituents and prevent excessive temperature. Since excessive temperatures cause thermal decomposition of fuel a selective burning of the constituents consequently develops a high density in the gases ahead of the flame front which prevents complete, efficient combustion of the fuel. This characteristic feature in the combustion process of the fuel depends on its stability or the atomic arrangements in molecules making up the fuel. As a matter of fact, paraffins being the least stable of fuel hydrocarbons will detonate with lower compression ratios. After the paraffins in order of increasing stability come olefins, naphthenes, aromatics and alcohols, then toluene, xylene and benzene. The proper mixtures for surest control of complete combustion and thorough vaporization of the fuel are essential. The knocking phenomenon has been linked to vaporization since the rate of gasification has been found to increase linearly with the boiling index of the fractions of the fuel. Stability and ignition temperatures of the fuel must be taken into consideration with respect to control of detonation. The remaining unburned fuel of an ignited charge should not crack or decompose suddenly and thus cause selective burning of the constituents. The ignition temperature should be higher than the existing temperature in the internal combustion chamber so that the charge be ignited by the proper means and at the proper time. Flame travel with constant uniform velocity is of importance. High compression aids in rapid combustion. Practical limiting value of compression ratio has been considered about 6–7 for maximum power performance. Minimum gasoline consumption and minimum wall temperature (absence of heat losses through radiation), smooth combustion chamber, without unevenness, corners, coarseness of the walls, disturbing the turbulent effect of the mixture, superior orifice coefficient of the valves determining the maximum turbulent effect are all different factors, to be considered in preventing detonation.

The detonation phenomenon in the combustion of gases is known to occur under certain specifically characteristic conditions. Thus, characteristic of detonation is a definite velocity in the transmission of chemical activity throughout the gas phase. This velocity is the velocity of sound attained under a critical pressure which controls also the combustion of the fuel. It is assumed that in addition to physical conditions also certain specific chemical compounds induce more or less detonation and are respectively called knock inducers or proknocks. On the other hand, substances capable of counteracting detonation are antiknocks or dopes.

The types of antiknocks used in the past have been classified roughly into three groups with respect to their specific activity and manner of action: (1) compounds such as tetraethyl lead and iron carbonyl which even in quantities from 0.1 to 0.2% have a well expressed antiknock effect, (2) compounds such as aniline and diphenylamine which must be added to the gasoline fuel phase in an amount of about 3% (3) compounds such as benzene, toluene, alcohols, serving as auxiliary fuel and which have to be added in several tens of percentages to bring about an antiknock effect.

Midgley, Ricardo and other investigators in the field of internal combustion also recognized certain characteristics effecting the classification of organic compounds in regard to their function as antiknocks, namely, that apart from arylamines and certain other nitrogeneous derivatives such as diphenyl urea, no other substances have been found similarly effective in preventing knock except ethyl iodide, quinon, cresol, phenol and diphenyl oxide, but none of these has been as effective as aniline.

On the other hand acids, aldehydes, nitro compounds like nitrates, nitriles etc., appear to promote knocking to some extent and that certain compounds such as ethylene dibromide and particularly ethyl iodide have a slightly opposite effect. Among the arylamines xylidine is about the most effective, although 30 times less effective than an equal volume of tetraethyl lead. As a rule meta-compounds are slightly more effective than the ortho- and para-compounds. Diethylamine is much less effective than diphenylamine, monomethylaniline is more, but dimethylaniline is less effective than aniline. In comparison with aniline, quinoline, pyridine and carbylamine, are ineffective as antiknocks. As a rough measure of the relative effect in counteracting knocking iron carbonyl, tetraethyl lead, nickel carbonyl, aniline were found to be expressed as respectively: 600, 400, 160, 11, 12, 1.

In the final analysis, it appears that two chief groups of antiknocks have been recognized in the past. First the metal organic compounds and second the pure organic compounds. As for the first group only metals with certain oxidizable properties were effective, namely, those with several steps of oxidation. In addition the metal atom of these compounds has the ability of exerting greatest action and thus to be the main active constituent.

Influence of temperature and concentration of oxygen have an important bearing on their behavior. In the group of organic compounds amines, quinons, phenols and certain ureas and nitriles are the main types of compounds, which are effective as antiknocks.

It has been ascertained likewise that all the substances found effective in counteracting detonation have been found to have a rather high boiling point and igniting temperatures. In this respect rather important appeared the observation that compounds with methyl groups, long chains, etc., have generally lower igniting temperatures and are more affected by antiknocks. On the other hand the reverse is the case for benzene, toluene, xylene. The stability of the antiknock compound itself appeared to be of great importance. If it is not completely broken up at the temperature required then it is not so likely to be very effective. For instance aryl compounds are less effective than alkyl compounds.

The influence of the nature and concentration of the fuel itself would also have a bearing on the extent of the thermal decomposition of the compounds. When various antiknocks have been discovered the question arose as to the mechanism by which they act. Among the organic compounds (amines, nitrils, phenols, quinons and certain iodides) their effectiveness as antiknocks has been linked to their ability to give rise to peroxides (aniline). Similarly phenols give rise to quinons, which in turn give rise to temporary higher oxides. These peroxides are presumably acting like those of metals and they react with the peroxides produced by the fuel and destroy them. Whether a peroxide would act as a positive or as a negative catalyst would depend greatly on the oxygen pressure as well as on the stability of the peroxide. If the external pressure of oxygen is increased the antiknock-peroxide and the oxidized fuel equilibrium becomes disturbed and the reformed peroxides will promote thereby the combustion of the hydrocarbons. This type of mechanism of action of antiknocks was thought to hold true for antiknocks such as tetraethyl lead, which has no effect whatsoever on the igniting temperature of hydrocarbon fuels or of intermediary aldehydes in an atmosphere of oxygen.

Whereas these antiknocks have very little effect on alcohols in air, they have an appreciable effect in raising their igniting temperature in oxygen. The effect of an antiknock on combustible gases is greater on that derivative composing it, which possesses the lower igniting temperature so that the resulting igniting temperature tends to approximate, the inference being that production of antioxidants is greater in the lower igniting derivatives. This is true of the members of a homologous series, the lower members igniting at a higher temperature than the higher members. This suggested, that the several oxidation products of combustible substances mutually may counteract a combustible and may not only produce a peroxide inducing combustion but also an antioxidant counteracting the effect of the peroxide. For example, findings of some investigators indicated that in the case of benzoyl peroxide formed in the combustion of benzene through diphenyl and its subsequent oxidation may be encountenacted by quinons also formed during the oxidation.

The behavior of antiknocks finds correspondence in that of inhibitors. Phenols, amines, quinons, certain sulfur and iodide compounds which are effective as antiknocks have been inhibitors in the oxidation of aldehydes, unsaturated hydrocarbons, etc.

If oxidation i. e., combustion, is a chain reaction involving free radicals action, then metallic antiknocks may be assumed to cause the fuel molecules to decompose into relatively few small molecules and thereby reduce the knock tendency. However, if we consider the fact that metallic antiknocks decompose at temperatures reached before the end of compression and that the metal-active agent to prevent knock is supposed to be deposited mainly on surfaces, it is rather difficult to visualize how this metal can be present later on to break the reaction chains in the end gas.

An antiknock agent has been thought to function by inhibiting the production of active oxygen produced by vibrations of a steady flame.

Antiknock compounds as agents counteracting detonation primarily retard the velocity of gaseous combustion. Since small amounts of antiknock are needed to exert a large effect on the character of combustion, this action bears some analogy to that of catalytic agents. Antiknocks do not affect processes of rapid combustion but are rather particularly sensitive to changes of the reaction rates.

In the presence of antiknocks it appeared that the rate of oxidation and generation of heat in the processes of slow combustion were less than without the antiknock and therefore the initial processes of combustion are retarded under the influence of an antiknock. The antiknock retarding oxidation acts as an inhibitor of a positive catalyst present in the system, thus being in itself a negative catalyst. Consequently the action of an antiknock is that of an anti-oxygenic agent. The function of an antiknock has been regarded as directed toward the absorbing of electrons and promoting recombination of ions prior to the combustion, thereby reducing the normal accelerations of the combustion rate.

Metal organic compounds serving as antiknocks may owe their efficiency to the colloidal state of the metal formed by thermal decomposition at the surface of nuclear particles.

Antiknock compounds may act by temporarily eliminating out of the sphere of action the active oxygen which otherwise reacts directly with the hydrocarbon constituents of the gasoline fuel.

Antiknocks are believed to have no effect on the velocities of propagation of combustion or explosive waves. It has been recognized that hydrocarbons with lower coefficients of oxidation like aromatic hydrocarbons also cyclohexene and trimethylethylene act as antiknocks, while hydrocarbons with high temperature coefficients of oxidation such as cyclohexenes, n-heptane and n-octylene the proknock substances. Thus, oxidation characteristics were correlated with knock tendency of hydrocarbons composing the liquid fuels. Egerton emphasized the fact that the action of metallic antiknocks is delaying oxidation by forming metallic peroxides thus breaking the reaction chain and preventing detonation.

It has been pointed out that antiknocks retard reaction of oxidation, lower temperature coefficients and these effects together raise the spontaneous ignition temperature. The effectiveness of antiknock compounds in internal combustion processes appeared to some investigators to be determined by the following factors (a) by a resistance to direct oxidation in air, (b) by the volatility (B. P. or high vapor pressure under 400° C.) and the manner of decomposing when heated in air at 200°–300° C. (c) by a high temperature in the oxidation as compared with the ignition temperatures of the constituent fuel hydrocarbons, and (d) by the degree of dispersion of the antiknock compounds to the extent of formation of colloidal dispersion which is favoring rapid oxidation.

One of the mechanisms of the antiknock-inhibitory gas has been the formation of a shell around the metal in the presence of which combustion of the combustible mixture takes place, thereby isolating the metal from the explosive mixture. Another theory held that if edges and sharp points left on the walls of the combustion chamber are places with high temperature then they accelerate combustion to the detonation stage and a deposition of an antiknock on these edges and sharp points should make them ineffective. However, if the effect of suppression action of an antiknock is merely due to a covering of edges and sharp points on the inside walls of the combustion chamber, then the effect would be greatly prolonged after the addition of the antiknock has been discontinued instead of ceasing in existence immediately. This hypothesis of action of an antiknock does not explain either why particular compounds of lead exhibiting organic valences are required or why the organic amines are also effective in this capacity.

To explain the action of metallic antiknocks an assumption has been made that a metallic film is deposited around nuclear particles of the hydrocarbons so as to prevent a subsequent autoxidation. If at a definite stage in the cycle of an engine a larger number of nuclear centers are established, promoting a uniform oxidation of the fuel throughout the mass, then the suppression action of antiknocks becomes similar to the action of an auxiliary ignition system, having the tendency to oxidize the fuel before the action of the actual flame front in the region of hot and highly compressed gases.

However, the above film theory has been opposed by the fact that colloidal suspensions of metals like those of lead and nickel in motor fuels possess no antiknock property while particles formed by the decomposition of metal organic compounds when serving as antiknocks are temporarily activated, and act superior to those of other origins.

The antiknock has been thought to function as a "screen" absorbing active radiations from the initial flame, necessary to insure the propagation of the flame. However, the screen theory seemed to be inadequate for explaining the function of detonation inducers or proknocks. The difficulty in the propagation of the flame has been explained by the fact that antiknocks decompose with the formation of readily oxidizable compounds which by virtue of their heat of combustion induce a partial combustion of gases in their immediate vicinity. It has been assumed also that the metal antiknock may act by virtue of its atoms absorbing electrons in the wave front and thus retard the velocity of propagation. Knock suppressors were postulated to catalyze one of two or more possible oxidation reactions e. g. hydroxylation of carbons which is least likely to result in detonating velocities. Antiknock action from the point of view of catalysis has been considered either as the function of a positive catalyst, postulating then that suppressors lower the ignition temperature to the point at which the heat of adiabatic compression causes appreciable but relatively slow chemical action to occur ahead of the flame so that the reaction wave would pass through partly burned hydrocarbon/air mixture, or as a simple negative catalyst and then the antikocks would serve to decrease the reaction velocity of the burning fuel.

Antiknocks being present in advance in the flame front and acting as absorbers of electrons or ions, which are supposed to be the direct cause of detonation will serve to trap a number of these ions playing part in the propagation of the explosion wave and thus cause a decrease in the velocity of combustion of the gaseous combustible mixture.

For the inhibitory effects of non metallic kock suppressors of the type of aminophenol, the action of free radicals has been considered explanatory. Free radicals may function also as "oxidation centers" producing still a more homogeneous combustion as an effect supplementary to the inhibitory action of the metal alkyl on the oxidation of aldehydes produced intermediary by partial oxidation of hydrocarbons.

The antiknock agents, acting as inhibitors for the slow oxidation reactions in the end gas, effect a short break of reaction chains and so prevent the chain development from reaching the critical point at which its multiplication starts.

The effect of antiknocks appears to be also that of increasing the critical pressure at which detonation occurs. Antiknocks are supposed to act in the sense of reducing the cool flame intensity and therefore the peroxide concentration, thereby lengthening the time lag at temperatures with a hot flame because of the decrease in the number of active centers.

If knock occurs as a result of a two stage autoignition (high temperatures promoting knock by reducing the first stage, while high pressures by reducing the second stage of autoignition) then from this point of view antiknocks would act by prolonging the second stage of autoignition.

Preignition being concerned with only the time lag in the single stage region at high temperatures and low pressures and therefore preignition rating of fuels has no definite connection with the knock rating.

One of the mechanisms of action of antiknocks presumed that antiknocks function by neutralization of (HCOO) radicals through combination with the metal atom from the metal carbonyl or other metal organic compound serving as antiknock in the gaseous space in front of the flame front.

Antiknocks may lower the knocking tendency of a fuel by decomposing organic peroxides in the engine in a chain reaction, in which lead of tetraethyl lead is alternately in the PbO and $PbO_2$ forms. Likewise the sulfur containing free radicals may break the chains by forming (PbS).

Such has been the path in the development of interpretations of the mechanism of the detonation phenomenon as well as the mechanism of action of agents i. e. —antiknocks—used to counteract the damaging and therefore undesirable phenomena linked to the occurrence of detonation in the internal combustion engine.

*Theoretical background of the present invention*

In the present invention the thought has been advanced that combustion in the internal combustion engine should be viewed not from a single angle relating to the phenomenon but rather considered simultaneously as a function of all the factors involved in the complex phenomenon of internal combustion. It appeared of utmost importance to distinguish and then to control the single reactions superimposed in the complete process of combustion of a fuel in the engine. On the other hand the diversity of hydrocarbon constituents of a fuel, according to the respective specification thereof, have to be considered with regard to their specific reactions when undergoing combustion in the engine. Finally the unusual physical conditions and factors characteristic of internal combustion only, have to be accounted for in the already complex process.

Combustion in an internal combustion engine can be either normal or abnormal. In the latter case it is always accompanied by undesirable phenomena such as preignition and/or detonation, leading, of course, to a deficient function of the engine with the result of bad fuel and engine performance.

Abnormal combustion is sharply distinguished from normal combustion with regard to the rate of combustion or combustion velocity as well as steadiness in maintaining the proper combustion during the work of internal combustion engines. While slow and steady combustion are characteristic features of a normal and efficient type of combustion process, sudden spontaneous combustion occurring sometimes in a split of a second attributed to combustion accompanied by detonation lowers considerably the efficiency of fuel combustion, damaging the function and performance of the engine in general.

The problem of normalizing combustion of hydrocarbon fuels in the internal combustion engine, due to the complexity outlined above, makes it a necessity to use for the conversion of the abnormal type of combustion into a normal and efficient type of combustion not a single catalyst but several catalytic regulatory agents in the form of heterogeneous mineral complexes, with each integral part of such a heterogeneous complex being chosen so as to perform its specific function in the combustion process.

The novel type of a catalyst used in this invention comprises heterogeneous mineral complexes of a type of a synthetic rock or ore synthesized best from naturally occurring minerals. The selectivity principle applied in making up the catalytic complexes has been based on combining (1) minerals of exclusive catalytic properties with respect to the specific types of reactions, composing the combustion process and the specific constituent hydrocarbons of the fuel, (2) minerals which are primarily contributing mechanical strength and stability to the catalytic complex and secondarily are also catalytically active in their own way although to a moderate extent, but at least in no way interfering with the catalytic activity of the catalytic complex.

In the present invention it has been postulated that normal, complete and efficient combustion can be achieved by the use of the above heterogeneous complexes of minerals due to their tendency through individual specific action to bring about a reversibility in reactions taking place in the engine and thus establishing mobile equilibria of reactions, which in turn effect a slowed down combustion so essential for the normal and steady type of the process. The choice of certain single catalytic ingredients making up the catalytic heterogeneous complexes has been based on the fact, that one of the most plausible mechanisms effective in internal combustion of the diversity of hydrocarbons (paraffins, olefins, cycloparaffins, naphthenes, aromatics, etc.) making up the gasoline fuel is the carbonium ion chain mechanism. The prerequisite for the synthesis during the origin of the diversity of hydrocarbons composing petroleum crude oils has been recognized as the tendency of sedimentary rocks, shales, sands and minerals present in the earth strata to display a marked catalytic activity in their formation by means of the carbonium ion mechanism and on the other hand the same carbonium ions have been found active in the cracking decomposition process of the same diversity of hydrocarbons in the crude oil. In my invention this type of catalyst is employed to effect reversibility in reactions coupled with the establishment of mobile equilibria essential for a slowed down normalized combustion in the internal combustion engine.

Under physical conditions prevailing in the earth strata reactive positive ions-protons are presumably formed, which coordinate with a small amount of a hydrocarbon, setting free the carbonium ions. These in turn undergo exchange with another hydrocarbon molecule and so a chain-propagating ion continues its catalytic activating action and thus becomes instrumental in bringing about the formation of various hydrocarbons composing crude oils. In its original form the production of carbonium ions in catalytic synthesis and catalytic cracking of hydrocarbons composing crude oil has been linked to slightly acidic types of oxides, silicates making up certain types of minerals. Hence one of the aspects of this invention has been to apply the carbonium ion mechanism in initiating hydrocarbon reactions by means of mineral heterogeneous complexes in the internal combustion engine and the theoretical background of this mechanism may throw light upon understanding it.

*The carbonium ion mechanism*

What is a carbonium ion and how is it formed? Carbon occupies a special position in the periodic table of elements situated on the borderline between electropositive and electro-negative elements. It has a reluctance to acquire a net charge and its free radical tends to saturate its free valences either (*a*) by chain transfer process, (*b*) by attacking a double bond and adding to one end of it, leaving free valence at the other end or, (*c*) by losing its activity through collision with another radical (collision between two radicals cause cessation of the chain).

A carbon free radical has theoretically a chance either (1) of losing an electron and forming a "carbonium ion":

or (2) of capturing an electron and forming a "carbanion ion"

Both ions are known to exist. The tendency for the formation of a carbonium ion is given by the ionization potential of the free radical. The ionization potential is the energy which is supplied to an atom or molecule in order to remove one or more electrons. However, formation of a carbonium ion from a free radical is rather rare, because the amount of energy is more than can be supplied by a most exothermic chemical reaction.

Hydrocarbon reactions involving the carbonium ion mechanism are initiated by the catalytic action of slightly acid silicates, minerals and clays. The acidic oxide type catalyst makes available possible hydrogen ions—protons capable of producing carbonium ions in contact with petroleum hydrocarbons. The carbonium ion mechanism may be regarded as a chain mechanism which may be started by a small amount of olefin, the latter coordinating with a proton to form a carbonium ion and molecular hydrogen is set free from the protonized complex with the catalyst. The initial ion undergoes hydrogen exchange with another hydrocarbon molecule and so the propagating ion continues its activating action.

According to Whitmore, F. C. (Ind. Eng. Chem. 26 94, 1934), the originator of the theory of carbonium ion mechanism, the olefinic double bond comprises a normal valence pair of electrons and two extra or "pi" electrons which endow the double bond with ability to attract positively charged groups, especially protons, expressed by the proton affinity.

The union of an olefin and a proton from an acid catalyst (mineral or mineral substance-clay) leads to the formation of a positively charged radical called a "carbonium ion" (C*).

$$CH_2=CH-CH_3 + H^+ \longrightarrow CH_3-C^*H-CH_3$$

Such an ion combines with a second olefin

This is then the basic reaction of acid catalyzed olefin polymerization and cracking proceeds by the reverse of this olefin polymerization ultimately producing noncrackable $C_3$, $C_4$, $C_5$ carbonium ions from the larger carbonium ion intermediates. The carbonium ion intermediates are formed in catalytic cracking of hydrocarbons. The small carbonium ions $C_3$, $C_4$, $C_5$ revert to olefins by loss of a proton which is the reverse of proton addition reactions or become small paraffins by hydride ion exchange reaction. Thus, for olefins the general reaction of proton addition is:

$$H_2C=CH-(CH_2)_n-CH_3 + H^+ \longrightarrow H_3C-\underset{*}{CH}-(CH_2)_n-CH_3$$

For paraffins (1) and naphthenes (2) the reaction of hydride ion exchange via the carbonium ion mechanism has been postulated. It is initiated by carbonium ions derived from small amounts of thermally produced olefins in the cracking system as follows:

(1)

$$C_3H_7^+ + CH_3-CH_2-(CH_2)_n-CH_3 \longrightarrow$$

$$C_3H_8 + CH_3-\underset{*}{CH}-(CH_2)_n-CH$$

(2)

In the case of aromatics as constituents of hydrocarbon fuel, the aromatic ring contains an equivalent of six "pi" electrons (three double bonds), which are mutually stabilized by strong resonance energy. According to Greensfelder (Ind. Eng. Chem. 41 2580 (1949), the association between carbonium ion and these electrons is given by the formula The forward reaction represents alkylation of an aromatic, while the reverse direction corresponds to cracking of an aromatic over an acid (mineral) catalyst. Thus, there is an analogy of initiatory mechanism for cracking of aromatics to that encountered in olefin cracking in sense of association with a proton, while hydride ion removal is characteristic of paraffins and naphthenes. In general the final ion may separate into an olefin and a proton or in cracking of saturates may remove a hydride ion from a neutral molecule to form a small paraffin and a new carbonium ion $R^+$. Furthermore two mechanisms may be assumed for the propagation of catalytic cracking of hydrocarbons making up the hydrocarbon fuels and likewise in their synthesis on polymerization:

(1) Proton transfer wherein a proton is returned to the catalyst or donated to another molecule to regenerate the cycle.

(2) Hydride ion exchange wherein a new carbonium ion is formed by release of a hydride ion to an existing carbonium ion.

The properties of carbonium ions have determined also the mechanism of other reactions namely isomerization of paraffins, hydrogen transfer reactions of olefins, alkylation of aromatics as well as the type of products attained thereby. In all probability, crude oils in the earth strata originated from fatty oils and unsaturated fatty acids as principal source materials and natural minerals, rocks adjacent to oil deposits acted as proton donors forming carbonium ions when in contact with heavy bitumen and petroleum oils.

In all probability the cycloparaffins (cyclopentanes) occurring in substantial proportions in gasolines could have originated partly by isomerization from cyclohexanes and in part by cyclization of dienes, due to the carbonium ion mechanism.

The carbonium ion as isomerization catalyst plays two parts: (1) it increases the amount of branched chain paraffins, (1)

and (2) converts naphthene hydrocarbons with cyclopentane rings into cyclohexane ring naphthenes, which are necessary for the formation of aromatics by dehydrogenation, (3)

The carbonium ion mechanism which is instrumental in isomerization of naphthenes according to the scheme:

effects also a few other reactions which serve to improve the octane value of the hydrocarbon mixture of the fuel.

These reactions are:

(1) Double bond shift of olefins (2) Isomerization of olefins

(3) Preferential saturation of isobutylene vs. n-butylene

Olefins, air and water individually or collectively act as promoters for the isomerization of n-butane. These compounds serve as a source of or cause formation of carbonium ions and the latter seem to be required to promote isomerization of paraffins. Olefins effect upon isomerization of n-paraffins has been ascertained and findings of Pines, H. & Warner, R. C. (J. Am. Chem. Soc. 68 595, 1946), indicate that in the isomerization of butane to form branched hydrocarbons through the carbonium ion mechanism 0.01% of butenes suffices to initiate the following sequence of reactions:

(1)

(2)

(3)

Among petroleum hydrocarbons obtained on catalytic cracking there is always at least a fragment of olefins present, which would be rapidly transformed, equilibrated thermodynamically by a number of ionic reactions including double bond shift, skeletal isomerization, polymerization and cracking. On the other hand gasolines obtained by thermal cracking in the absence of catalysts promoting origin of olefins and their transformations would make their properties more dependent upon conditions of further cracking in the internal combustion engine.

The use of heterogeneous mineral complexes contemplated in this invention in which integral parts are minerals acting in terms of the carbonium ion mechanism permits the achievement of a multiplicity of actions with respect to the essential reactions involved in the the internal combustion process. Likewise the carbonium ion effects proper balancing of equilibria with respect to catalytic reactions of a diversity of hydrocarbons making up the combustible hydrocarbon fuel.

The theory of the carbonium ion mechanism as outlined above as well as the fact that mineral catalysts are in all probability the most effective catalysts in the synthesis and decomposition of the diversity of hydrocarbons making up petroleum fuel, provide the foundation for their use in regulating reactions of the latter in the internal combustion engine. The heterogeneous mineral complexes proposed in the present invention as catalysts and regulating agents for the reactions within the internal combustion engine act catalytically not only with respect to regulating the velocity of combustion by establishing a reversability of reactions involved, creating thereby mobile equilibria resulting in slowing down of the reactions and thus normalizing the process of combustion, but they also have other functions as well. Heterogeneous mineral complexes are catalysts with respect to (a) single reactions involved in the combustion, namely, decomposition of hydrocarbons, dehydrogenation and finally oxidation, (b) reactions specific for the type of hydrocarbons of the fuel, differentiated as olefins, paraffins, naphthenes, aromatics, etc., (c) physical phenomena accompanying internal combustion processes in the engine, such as preignition, carbonization and detonation.

*Essential physico-chemical properties of minerals determining their catalytic activity*

Natural mineral catalysts in the form of heterogeneous complexes, conceived as catalytic and regulatory agents in this invention, are distinguished by their specific physico-chemical characteristics, essential for their catalytic activity as well as stability, linked closely together especially in the case of specific conditions prevailing in the internal combustion engine. Minerals and mineral substances derived by nature under unique conditions of origin, differentiated greatly in their chemical constituents and structural configuration, crystallization form, spatial arrangements with respect to each other as well as in their respective physico-chemical characteristics and properties from anything of this kind artificially synthesized, represent materials of specific catalytic activity and a degree of stability essentially needed under the drastic conditions of internal combustion. In nature, all minerals are known to have developed freely and slowly in time without interruption of action. Almost all minerals are in a crystalline state largely due to the manner of origin and each is characterized by a regular atomic pattern. Minerals have been formed either (1) from solution, (2) from fusion, or (3) by sublimation from vapors as the lava or molten rock material cooled, the elements grouped themselves into various molecules which clustered together to build the individual mineral grains of the resulting solid rock or ore, whereby the growth of large crystals has been promoted under conditions of very slow cooling.

Minerals have definite characteristics of their own in sense of chemical composition, crystalline structure, definite shape or form. Most minerals have the "ionic" type of bonding in which the interatomic binding forces consist of an attraction between oppositely charged ions. All the silicates, oxides, carbonates, phosphates, etc. in the respective minerals serving as ingredients of the heterogeneous mineral complexes, are built in this manner. In the formation of crystalline minerals the size of the constituent ions and the magnitude of electrical charges carried by them are of great importance.

Minerals are seldom simple chemical compounds and the fact that most of the species of minerals vary somewhat in composition is due largely to the interchange between different ions of similar size which act as proxy for each other in the crystal structures with effective radii of selected ions.

Since 40% of the common minerals (quartz, feldspar, micas, etc.) have ring and chain structures even their structural configurations acquire great significance for their action as catalysts in the catalysis of internal combustion.

While it is possible to use a heterogeneous mixture of synthetic mineral catalysts or salts corresponding to the make up of inorganic minerals of the type that are known to catalyze the reactions involved in the internal combustion of hydrocarbons, it is preferred to utilize a heterogeneous mixture of those occurring in nature. These naturally occurring minerals usually contain admixed traces of rare earths and rare elements likewise contributing to the catalytic activity.

In the selection of individual components of the catalyst in the form of heterogeneous mineral complexes for utilization in accordance with this invention their catalytic activity is determined with respect to (a) the single reactions involved in combustion (such as decomposition, dehydrogenation and oxidation), (b) the reactions of the types of hydrocarbons present in the fuel used, (c) the carbonium ion mechanism, (d) the detonation, pre-ignition and carbonization and other physical phenomena accompanying internal combustion in the engine.

The heterogeneous natural mineral complexes have derived their catalytic activity from specific physicochemical characteristics. Their catalytic activity is brought about (1) by the homogeneity of fine dispersions of the order of a colloidal state of the oxides and silicates normally characteristic of such minerals and having therefore an extremely large catalytically active surface, (2) by the favorable structural configuration of essential catalytic elements as result of a slow crystallization in the earth strata during their formation, (3) by the multiple rather than single action of the catalyst in which certain of the ingredients activate each other and promote catalytic action by intensifying the catalytic effect—activation through ionization or bombardment of emitted electrons in case of photo-thermo luminescent properties of certain minerals compounded together in the heterogeneous complexes.

All the above types of activation are essential in effecting proper combustion and controlling it to the extent of a normal and steady process. In accordance with this invention certain catalysts combined in the heterogeneous mineral complexes are effective as pro-oxygens or oxidation catalysts, thus accelerating combustion, while others being typical antiknocks are anti-oxygens counter-acting spontaneous too fast combustion, always accompanied by the detrimental phenomenon of knocking. It appears that one of the ways of balancing equilibria is by applying to one surface of the combustion chamber (e. g. or the cylinder head adjacent to the igniter) a catalyst that is markedly pro-oxygen, while a catalyst being markedly anti-oxygen is applied to an opposing surface (e. g. on the head of the piston).

Minerals chosen as constituents in the heterogeneous mineral complexes have been classified primarily in regard to their specific catalytic action in the internal combustion engine.

My heterogeneous mineral complex should consist of a mixture of: (1) minerals serving as catalysts in hydrocarbon decomposition, (2) minerals serving as catalysts in hydrocarbon dehydrogenation, (3) minerals serving as catalysts in oxidation reactions, (4) minerals serving as catalysts in terms of the carbonium ion mechanism, (5) minerals serving primarily as antiknock agents and preferably but not necessarily, (6) minerals serving to contribute activation through emitted electrons i. e. thermo and photo-luminescent minerals. Minerals of the foregoing types are selected from the following groups of minerals and mixed together as hereinafter explained to produce my heterogeneous mineral complex.

(1) Minerals—catalysts in decomposition:

*Carnotite.*—(Utah). ($K_2O.2U_2O_3.V_2O_5 3H_2O$) with uranium oxide as ingredient is an active catalyst in decomposition of hydrocarbons. Rare elements in it also enhance its activity while $V_2O_5$ in itself is an active oxidation catalyst. Altogether carnotite improves burning characteristics of the motor fuel.

*Fluorspar.*—(Tres Hermanos, New Mexico). ($CaF_2$) (sp. gr. 2.97–3.25; H=4; d.=3.2 g./cm.$^2$ cubic hexaoctahydral). Possesses high reflectivity. Serves as a catalyst in decomposition of hydrocarbons as well as a catalyst in the conversion into antiknock gasoline.

*Wolframite.*—(Cumberland Pass, Colorado, South Dakota). ($FeMnWO_4$) (sp. gr. 7.14–7.54; H=5.5 monoclinic). Both iron and manganese tungstates are active decomposition catalysts. Iron tungstate is likewise active as a dehydrogenation catalyst specifically for cycloparaffins and naphthenes.

*Zircon.*—(St. Peter's Dome, Pikes Peak, Colorado). ($ZrO_2$—$SiO_2$) is a catalyst in catalytic decomposition especially in terms of the carbonium ion mechanism. Zircon on bentonite carrier ($Al_2O_3$—$ZrO_2$) is a cracking catalyst for production of motor fuel of increased octane number.

(2) Minerals—catalysts in dehydrogenation:

*Apatite.*—(New Mexico, Virginia) ($3Ca_3P_2O_8CaCl_2$) or ($Ca_5F(PO_4)_3$) (sp. gr. 3.15–3.37; H=4.5–5; density 3.16–3.22 g./cm.$^2$, bipyramidal, hexagonal). A phosphate rock containing various rare earth oxides (La, Nd, Pr, Sa, Dy, Yb, Er, Eu) and chiefly thorium and cerium oxides act as catalysts in dehydrogenation-oxidation reactions of the combustion process.

*Copper ore.*—(Copper Gulch, Colorado) (Cu) (sp. gr. 8.8–8.9; H=2.5–3.0; cubic system). Catalyst in dehydrogenation of paraffins, cycloparaffins and in oxidation of olefins and aromatics.

*Magnetite ore.*—(Fremont, Colorado) ($FeO.Fe_2O_3$) (sp. gr. 4.9–5.1; H=5.5–6.5; d.=5.0–5.2 g./cm.$^2$; compressibility 0.55 dyn $^{-1}$/cm.$^2$; thermal conductivity K=107 at 400°; cubic system). In the presence of silicates it acts as a dehydrogenation catalyst for cycloparaffins. As iron catalyst it is active in decomposition of hydrocarbons. It is a catalyst for dehydrogenation of paraffins. Under specific conditions it may serve as a potential antioxidant or antiknock. Magnetite produces crystals of the type of spinel ($MgAl_2O_4$). Magnetite is also an oxidation catalyst for aromatics.

*Argosite.*—(Bentonite with montmorillonite as chief ingredient—thermal conductivity $9.5 \times 10^{-7}$; linear expansion coefficient $19.5 \times 10^{-7}$ at 100° C.; high reflectivity and emissivity, belongs to the pyrophyllite group rich in water and silicic acid and differs in essential characteristics from kaolin ($Al_2O_3.2SiO_2.2H_2O$) of the halloysite group). Argosite is an effective catalyst in dehydrogenation of paraffin hydrocarbons. Use of bentonite due to montmorillonite as chief ingredient has been interpreted in its function as a cracking catalyst. Its catalytic activity attributed partly to hydrogen ions which serve to balance the valence and the coordination number within the atomic network containing two different metals and oxygen. The cracking of olefins, paraffins and naphthenes, the dealkylation of aromatic hydrocarbons and isomerization reactions of hydrogen transfer in the presence of this type of bentonite-catalyst has been explained in terms of chain reactions involving the carbonium ion mechanism on account of formation of carbonium ions in a slightly acid medium in the presence of this catalyst. Bentonite as a carrier for metallic oxides improves oxidation-combustion processes. Bentonite with Ni tungstate or nickel sesquioxide plus vanadium pentoxide, chromium trioxide, ferric oxide or molybdenum trioxide serves to improve oxidation processes. Montmorillonite as an Al—Si hydrate with Si content exceeding 70% contains small proportion of iron and alkaline earths and as such has the ability to provoke at once the rupture and branching of the carbon chain of aliphatic hydrocarbons when placed in contact with them. The isomerization occurring thereby is due to the fact that on contact with this type of a clay the aliphatic hydrocarbons dissociate into radicals followed by a regrouping of these with the formation of more branched chains, than originally present in the starting system. On the other hand the active silicates formed in a slightly acid medium by Si—Al hydrates of montmorillonite clay when circulated in contact with petroleum distillates at 400°–500° act as dehydrogenation catalysts. Since any oxidation combustion process may be viewed indirectly as a dehydrogenation process, the use of argosite is, indeed, beneficial and instrumental as a catalyst component of the heterogeneous mineral complexes. The use of suspensions of bentonite-argosite is not advisable due to the possible formation of thixotropic gels and doubtful activity and stability in this form.

(3) Minerals—catalysts in oxidation reactions: Boric acid ($H_3BO_3$), sodium borate (borax) and chiefly ulexite, colemanite, kernite or rasorite all serve as oxidation catalysts.

*Ulexite.*—(Chile, Bolivia, Peru)

$$(Na_2O.2CaO.5B_2O_3.16H_2O).$$

Boric oxide plus clay bentonite is an oxidation catalyst. It also serves to eliminate carbon sedimentation; ($Al_2O_3$—B) or ($TiO_2$—B) similar to ($SiO_2$—$ZrO_2$) and ($SiO_2$—MgO) which are also catalysts in catalytic cracking in terms of the carbonium ion action.

*Colemanite.*—(California and Nevada)

$$(2CaO.3B_2O_3.5H_2O).$$

*Kernite or rasorite.*—(Kern County, California) (29% $B_2O_3$).

*Vanadite ore.*—(Riple, Colorado). ($3Pb_3V_2O_8PbCl_2$) (sp. gr. 6.7–7.2; H=2.5–3.0; Rhombic system) oxidation catalyst.

*Vanadinite.*—(St. George, Utah).

$$(9PbO.3V_2O_5.PbCl_2)$$

(sp. gr. 6.7–7.7; H=3; hexagonal system) oxidation catalyst.

*Molybdite.*—(Climax, Colorado).

$$(Fe_2O_3.MoO_3.8H_2O)$$

(sp. gr. 4.7–4.8; H=1.0–1.5) catalyst in oxidation.

*Malachite.*—($CuCO_3.Cu(OH)_2$) catalyst for oxidation of aromatics and under specific conditions serves to isomerize olefins.

(4) Mineral catalysts acting in terms of the carbonium ion mechanism:

*Routile.*—(Pablo Beach, Florida). ($TiO_2$) (sp. gr. 4.12; H=6–6.5). Especially in the presence of boron ($TiO_2$—B) routile acts in catalytic cracking in terms of carbonium ion mechanism ($TiO_2$—$Mo_2O_3$) is a dehydrogenation catalyst of hydrocarbons boiling in the gasoline range.

Similar in action are:

*Ilmenite.*—($FeO.TiO_2$) (52% $TiO_2$) (sp. gr. 4.5; hexagonal system).

*Quatase.*—(Graves Mountain, Georgia, North Carolina) rutilated quartz.

*Arizonite.*—(North New York) ($Fe_2O_3.3TiO_2$) (Pinacoidal class).

*Tremolite.*—(Sudbury, Ontario, Canada).

$$(CaO.3MgO.4SiO_2)$$

or ($CaMg_3(SiO_3)_4$) (H=5–6; thermoluminescent). Catalyst in term of carbonium ion mechanism.

*Zircon.*—(St. Peter's Dome, Pikes Peak, Colorado). ($ZrO_2.SiO_2$) (sp. gr. 4.02–4.86; H=7.5; tetragonal prisms). Catalyst in catalytic cracking via carbonium ion. Catalyst in obtaining high antiknock fuel.

(5) Minerals acting primarily as antiknocks:

*Graphite.*—(C) (M. P. 3500° C.). Expansion coefficient $7.8 \times 10^{-7}$ at 40° C. is an antiknock agent and slows down the combustion. Contributes to a steady combustion. It causes catalytic reduction of CO.

*Antimony potassium tartrate.*—(Tartar emetic mordant) (KSbO) ($C_4H_4O_6.\frac{1}{2}H_2O$). Antiknock agent—inhibits deposition of carbon.

*Galena.*—(Monarch Pass, Colorado). (PbS) (sp. gr. 7.3–7.6; H=2.5, cubic system. Antiknock agent, photoelectric.

(6) Minerals contribution activation through emitted electrons: (Thermo or photo-luminescent) Willemite (2ZnO — $SiO_2$). Photo - luminescent (rhombohedral; H=5.5); being strongly photo-luminescent acts as activator in addition to having regular catalytic properties.

Similar action have:

*Calcite.*—($CaCO_3$) (sp. gr. 2.7).

*Magnesite.*—(Delta, Utah). ($MgCO_3$) (sp. gr. 2.2–3.2; H=3.5–4.5).

*Mechanical strength and stability of heterogeneous mineral complexes*

The catalytic activity of heterogeneous mineral complexes as such does not suffice unless they are capable of withstanding the exceptionally drastic physical conditions dominating in internal combustion. It is imperative that the mineral complexes maintain their mechanical stability in time and that under conditions prevailing in the engine the catalytic activity is also maintained due to regeneration. Mechanical strength and stability go hand in hand with catalytic activity in so far as the latter may be maintained only in a stable system. Mechanical stability requires that heterogeneous mineral complexes be synthesized into an entity from integral parts of definite structural configuration held together by strong physico-chemical forces.

Internal binding of the ingredients in heterogeneous systems of minerals to bring about a system of high mechanical strength and durability can be achieved: (1) through a proper choice of ingredients-minerals so as to impart essential specific characteristics such as hardness, sufficient specific gravity, etc., (2) by adding specific hardening and plasticizing agents of a mineral type to enforce a still greater mechanical strength, (3) by adding a type of ingredient which in itself heterogeneous in composition has become mechanically strong due to an excess of binding forces and being in a saturated state has some free valences available to be shared with components of a new system of similar nature of which it became an integral part, (4) by introducing into the complexes a couple of ingredients which under conditions of setting and curing of the system produce in status nascendi films in the interfaces between single grains or mixed crystals first during tempering and also under conditions prevailing in the engine, to the effect that greater strength and stability of the complexes is achieved, (5) by adjusting the integral part of the mineral complexes in sense of structural elements so as to eliminate insufficient as well as excessive porosity by combining them so as to eliminate excessive expansion or contraction under conditions prevailing in the engine, and (6) by incorporating into mineral complexes such ingredients which make the system water and oil proof and thus preventing the catalytic mass from disintegration. In the final end all measures taken to produce definite reproducable structural configurations of ingredients internally bound by specific bonds of high strength should by no means interfere with the inherent catalytic activity possessed and exercised by the catalytic mass.

Stability of catalytic coatings prepared from heterogeneous mineral complexes is determined by certain factors: (1) The final mixture of minerals must be rather plastic, plasticity being determined by the type as well as the amount of plasticizing minerals used to effect it. Plasticity in turn depends greatly on the type and amount of salts if such were incorporated into the complexes. (2) The mixture must contain a specific light and plastic filling agent which serves to eliminate an excessive porosity. (3) The mixture must contain structural elements responsible for a coherent character of the mass and also have certain ingredients which provide a better adherence to a surface to which the coating is to be applied. On the other hand agents added to promote and improve cohesion and adhesion characteristics of catalytic coatings of mineral complexes type of a catalyst must not act as inert bodies and as such interfere with their catalytic properties but, on the contary, contribute at least slightly to the catalytic action or act additive to the latter as promoters.

In the attempt of controlling structural properties and stability of heterogeneous mineral complexes by their proper choice it has been learned that the appropriate chemical composition and structural configuration of minerals providing better cross binding of integral parts is even of greater significance and prevails over the effects exercised in this respect only by physical conditions under which the mineral complexes have been synthesized. In other words the internal chemical binding, the production of strong bonds, their maturing on tempering and the resulting structural and spatial crystalline configuration are factors of primary concern in regard to both the stability and activity of the system and the physico-chemical conditions under which they were synthesized are secondary in importance.

Superior physical properties such as higher stress/strain relationship, tensile strength, better heat resistant qualities and stronger cross bindings are, indeed, vital in heterogeneous mineral complexes when used as catalysts in internal combustion and are acquired by them through the introduction of specific mineral ingredients contributing to such characteristics.

In general, bonds of much higher coefficient of expansion than that of granules being bonded are unsatisfactory because of a tendency in the products for sensitiveness to thermal shocks or tendency for cracking of the bond to occur with the resultant weakening of the structure of the system.

In this condition it has been recognized that fluxes of the soda or potash type alone are often undesirable because they tend to raise the expansivity of the bond considerably. However, the use of phosphate radicals in conjunction with alumina as a flux is free from this disadvantage since there is little or no tendency then to raise the expansivity of such a bond. The use of a high calcium content in association with these phosphate radicals has to be avoided since it results in bonding which lacks the desirable properties. Vitrified bonds having low moduli of elasticity are also produced by using phosphate radicals in conjunction with alumina. These bonds are more resistant to fracture by mechanical shock than are ordinary bonds of high moduli of elasticity. A low modulus of elasticity means that the new bonds will deflect more under a given bond or have a greater deflection before rupture and thus produce toughness in the system. As a rule a bond must have about the same coefficient of expansion as that of the granular material that is to be bonded and in this respect phosphoric oxide with alumina in the bond has little or no tendency to raise the expansivity of the bond.

Beside permanent bonds sometimes a type of temporary binders may be used to give strength to the system before the permanent bonds have been developed sometime only after curing. The temporary binders such as sodium silicate or some organic binders are substances which disappear or are burned out during firing or tempering operations. Their function in a temporary way is to intermingle with the constituents of the new bond mixture, aid in the formation of the permanent bond. However, for the system in question the organic type of temporary bonds proved of no value.

Various kinds of bonds are responsible for cohesion established in matter. Those bonds which may be considered as intermolecular are secondary bonds on the ground of their very much lower energy content.

The difference in energy between primary and secondary bonds (about 1–2 orders of magnitude) is manifested in the resistance to mechanical deformation.

The silicates in the respective minerals offer a very striking example of the influence of the nature of the bond upon the mechanical properties of a substance. The manner in which silica tetrahedrons are oxygen joined to one another is of great importance for the deformation ability of the silicate lattices. A frequently occurring type of primary bond which is of concern here and possesses a very great energy content is the Si—O—Si bond. As far as the nature of bonds is concerned, bonds within the chain molecules are chemical-covalent, while those between the chains are rather physico-chemical or Van der Waals bonds in character. However, the metallic properties of the crystals seem to indicate that these bonds are not exactly of a pure type. Among bonds responsible for the coherence of single mineral ingredients within the novel heterogeneous mineral complexes are also a series of boron bonds. The boron-aluminum bond is found, for example, in tourmaline—a complex silicate of boron and aluminum with Fe, Mg, Na, Ca and Li present in various small amounts. At least 1% of phosphoric oxide, alumina and boric oxide develop a glossy interstitial cementing phase when incorporated in the respective system which brings about a bond for aluminous grains. The boron-carbon bond has been produced in status nascendi at temperatures of curing and under conditions of internal combustion due to coexistence in the mineral complexes of boric acid, borax or ulexite (kernite or colemanite) and graphite or Carborundum, whereby boron-carbon films originate throughout the mass of the mineral complexes on surfaces of the integral mineral grains of the aggregate as well as in their respective interfaces. These boron-carbon bonds, distributed homogeneously render a continuity of coating externally and internally throughout the mass and contribute to the strength of the bonded structure.

The strength within certain limits is greater when a sufficient amount of bonds as well as a variety of bonds has been brought about in the compounded synthesis of mineral complexes.

Any of the following minerals are used as components of the various heterogeneous mineral complexes to impart mechanical strength and durable stability: Ulexite [($Na_2O.2CaO.5B_2O_3$)($16H_2O$)] or kernite (rasorite) [($Na_2O.2B_2O_3$).$4H_2O$] (29% $B_2O_3$) or sassolite [($B_2O_3$)($3H_2O$)] or colemanite [($2CaO.3B_2O_3$)($5H_2O$)] (40% $B_2O_3$) or borax ($Na_2O.2B_2O_3$).$4H_2O$ or boric acid ($H_3BO_3$). Boron-carbon films ($B_4C$) produced by pyrolytic decomposition of above boron compounds in the presence of carbon provide greater thermal endurance, hardness, and serve to increase coefficient of expansion.

*Beryl.*—(Portland, Connecticut). ($3BeO.Al_2O_3 6SiO_2$) occurs in pegmatite discs and in emerald. It contributes mechanical strength to the mineral complexes. Beryllium oxide in itself having strong mineralizing characteristics similar to sillimanite ($Al_2O_3.SiO_2$) and mineralizing mixture of strontinnite, borax and lepidolite, induces the formation of mullite crystals which influence the endurance of a system at high temperatures and give strength to it. Mullite—(Isle of Mull) ($3Al_2O_3.2SiO_2$).

*Carborundum.*—(SiC) (Acheson process): ($SiO_2+3C$ $=SiC+2CO$) occupies a unique place as a good conductor of heat. Its conductivity is equal to that of graphite. Silicon carbide (Carborundum) carbides of boron, tungsten and/or tantalum when incorporated into the mineral complexes contribute toward better binding and internal coherence. Silicon carbide in turn is well bonded either with clay or held with its own crystals formed on recrystallization.

*Cryolite.*—("Ice Stone" Greenland). ($Na_3AlF_6$) or ($3NaF.AlF_3$) (H=2.5–3) monoclinic prismatic containing 13.23% Al, 32.7% Na and traces of $Mn_2O_3$, MgO, vanadic and phosphoric acids, as well as fluorspar ($CaF_2$) stiffen the bonds and help to maintain a firmer grip in linked grains making up the mineral complexes system.

*Wavellite.*—(Minan Bridge, County Cork, Ireland). ($Al(OH)_3(PO_4)_2.5H_2O$) radical fibrous, orthorhombic. Serves as a source of aluminum phosphate radicals which in a silicate composition function as a flux and cause a certain degree of fluidity. These radicals have a tendency to confer also an increased water resistance and bestow properties upon the system by prolonging its life span, shortening time of thermal curing and permitting lower heat treatment in tempering.

*Syngenite or caluszite.*—(Galicia, Austria).

$$(K_2Ca(So_4)_2)$$

are rather rare minerals which act similar to potassium fluoborate ($KBF_4$) and serve to produce better bonding and contribute strength to the system in which incorporated. They belong to the group of hardening agents and behave as such with regard to the heterogeneous mineral complexes.

*Flint.*—($SiO_2$) ($H=7$ or that of quartz) is pure silica and is most important batch ingredient in ceramics manufacturing. It is hard, non-absorbing and its addition to a system reduced plasticity and workability. Flint increases rate of drying, reduces the tendency of a system to deform or warp. In the tempered mineral complex system flint adds strength, toughness and hardness, thereby enhancing all the mechanical strength properties of it. Flint acts as a factor in regulating volume changes in a system affected by heat. A proportion of flint makes silicates of the system less fusible.

*Feldspars.*—Orthoclase ($KAlSi_3O_8$) or microcline ($K_2O.Al_2O_36SiO_2$ or $KAlSi_3O_8$) (Delaware County, Pa.). Feldspars like flint are typical nonplastic minerals which impart hardness to a system in which used. The higher the temperature the more effective the feldspar acts as a fusing agent and the more feldspar present in the system the harder the mass. However, if a system has a tendency to warp or sag it indicates that the feldspar content is too high. The fusibility of feldspar promotes density and decreases porosity while with increased content of $Al_2O_3$, porosity increases. Perfect fusion ensues fritting or vitrification. Feldspars have a tetrahedral frame work with metallic ions incorporated in its interstices. The acid radicals extend through the crystals. Such extended radical structure is not confined to silicates alone, since similar complexes of linked triangles occur in the borates. Silicates, to which feldspars belong, offer a very striking example of the influence of the nature of the bond upon the mechanical properties since the manner in which $SiO_4$ tetrahedrons are oxygen joined to one another is of great importance for the deformability of the silicate lattices. $SiO_4$ tetrahedron is actually the fundamental unit of all silicates and occurs either singly or in groups formed by sharing of one or more of the oxygen atoms by adjacent tetrahedrons. Nepheline syenite (Canada) ($K_2O.3Na_2O.4Al_2O_39SiO_2$)—a feldspathoid effectively replaces feldspar when used as a flux with the purpose of lowering maturing temperature and making possible a longer firing range, increasing strength and decreasing absorption.

*Micas.*—(Muscovite) ($K_2O.3Al_2O_36SiO_22H_2O$) (Canon City, Colorado). Biotite ($KH_2(MgFe,AlF_2(SiO_4)_3$) and lepidolite ($KLi(Al_2OHFAl(SiO_3)_3$) have been used in small amounts in heterogeneous mineral complexes chiefly for the purpose of decreasing porosity by such a light plastic filler. Mica has also a certain significance on account of its property under conditions of internal combustion to generate free hydrogen which may be regarded as a factor counteracting excessive oxidation and thus contributing to a slowing down of excessive and too rapid oxidation effecting thereby a steadiness of the combustion process. In addition, for example, lepidolite, as a chief source of metal Li (4%) and carrying also 3% $Rb_2O$ and 1.77% $CsO_2$ contributes greatly to the hardening of the mineral complex system.

Among other hardening agents used in the novel heterogeneous mineral complexes important parts are played by minerals containing titanium such as: Routile (New York and Pennsylvania) ($TiO_2$); benitoite (San Benito County, California) ($BaTiSi_3O_9$) (sp. gr.—3.65; $H=6.5$) bypyramidal-hexagonal system; titanite ($CaTiSiO_5$) (sp. gr. 3.4–3.6; $H=5–5.5$ monoclinic, $d.=3.48$ g./cm.²). Titanium oxide as well as the titanium silicates all contribute to mechanical strength of the mineral complexes. Routile and fluospar minerals have the same structure and this is of importance when they are used together in the mineral complexes on account of the isomorphous structure being related to the formation of mixed crystals.

*Tourmaline.*—(Pala, San Diego County, California). $Si_6B_3O_{27}$ (AlFe) containing small amounts of Mg, Li, Mn (trigonal system) is a typical hardening agent.

*Wulfenite ore.*—(Utah, Nevada, Arizona) ($PbMoO_4$) (tetragonal system.) Increases strength, toughness and wear resistance.

*Andradite.* — ($3CaO.Fe_2O_3.3SiO_2$) — garnet variety ($H=6.5$) contributes to mechanical strength likewise Chromite ($FeCr(CrFe)O_2)_2$ ($H=5.5–8.9$). Cubic hexa octahedral system.

Since the compounded catalytic heterogeneous mineral complexes in their chemical composition as well as in structure are close to and resemble to a certain extent that of ores and rocks, it is logical to increase the specific gravity as well as strength of the components of mineral complexes by using certain types of rocks as ingredients. It is reasoned that natural rocks of the type of granites or marbles constitute systems which originated by a slow process of crystallization and agglomeration of minerals which were bonded by an excess of some binding agents, thus being saturated systems with an excess of free residual valences which are still available for utilization in a new system into which they happen to be incorporated. From the standpoint of catalytic action, their single constituents should act additively and promote instead of counteract the catalytic action of other mineral components.

Rock particles are composed of mineral crystals grown in place; they are fragments of crystals or rocks deposited individually. Thus, for example, granites possess a coarsely crystalline texture and a typically massive internal structure made up of feldspars, quartz and smaller amounts of different types of minerals including micas. Sedimented rocks have as binding agents quartz, $Al_2O_3$, mergle, iron oxide and iron hydroxide. These are often infiltrated by amorphous binding agents, such as converted limestone-dolomite. Dolomite is obtained by a process called dolomitization in which replacement of Ca by Mg or the solution and removal of calicum carbonate take place. These changes occur in calcareous stones, carbonate of lime and marbles before or after the rock has been solidified. Limestones with 5–15% MgO are magnesium limestones and those with near 20%— dolomite limestones. Calcite is the chief mineral of limestone.

*Dolomite.*—($CaCo_3.MgCo_3$) has been used as a component in the synthesized heterogeneous mineral complexes to compound a harder body with greater ability to withstand cracking. Marbles which are metamorphosed limestones and represent crystalline rocks composed of grains of calcite and more rarely of dolomite proved to be of less service than granites. Thus, by careful control of the chemical composition of the synthesized mineral complexes through coexistence in them of various suitable radicals making up the respective bonds, as well as by securing proper uniform grading aggregates, structures of higher stability have been achieved which otherwise would possess little coherence. Since exceptional stability is the prerequisite for any catalytic material to be used with success under conditions prevailing in the internal combustion engine the use of the above listed minerals has been a necessity.

Expansion of the material of heterogeneous complexes continues usually until the bulk of the hygroscopic internal water is driven off on setting and until the particles of the body have room to set closer together.

Contraction takes place on evaporation of the last traces of water of crystallization during the drying and fusion while firing. A body usually shrinks significantly as red heat is attained (about 1200–1400° F.) Should the shrinkage proceed unevenly throughout the mass, internal strains are set up which cause rupture and distortion of the surface of mineral complexes. Dead sound usually reveals hidden internal cracks by hitting or knocking with a hammer for test. Incorporation of a fusible material may serve to counteract shrinkage. As far as the bentonite-ingredient of the complex is concerned the size of particles and the rate of drying are factors influencing shrinkage. Painting or lubricating with graphite helps to overcome shrinkage. Plasticity on the other hand is essential to a great extent for the heterogeneous complexes since it is chiefly a property permitting proper molding into shape when mixing the mineral complexes ingredients with a suitable quantity of water. An excess of plasticity proved likewise unfavorable in case of the mineral complexes. Excess plasticity often has been brought about by the addition of certain salts to the mineral ingredients of the complexes but could be counteracted by adding flint. Cracks will result in the novel synthetic complexes from a high silica content, dense clays, careless setting, during curing or tempering as well as from improper drying or burning. Careful cooling, after tempering as a rule gives sound products, while too rapid cooling should be definitely avoided or the product becomes brittle and is liable to crack readily.

Too slow cooling causes too great a crystallization if the material is close to fusion or partly molten. When the temperature falls to red heat, the fusion temperature of the eutectic has been reached and from this stage cooling must proceed slowly, especially if the complexes are high in silica content. However, high silica content may always be remedied by adding more of the plastic material namely by using a larger proportion of clay. Cracking is caused chiefly by too great difference in expansion and contraction.

Closely allied to cohesion is the character of hardness of the novel material which is defined and measured by the resistance which a mineral complex offers to scratching. Hardness of the synthetic complexes depends, to a great extent, on how far the crystalline structure has been preserved.

The external and internal surfaces of the synthetically compounded mineral complexes must be without cracks to prevent moisture in the form of oil or water from being drawn either by capillarity throughout the mass due to porosity or through cracks in the surfaces or interfaces.

The oil and water proofing may be achieved by taking specific measures: (1) producing strong chemical and physical bonds or linkages between single ingredients composing the respective complexes; (2) through a choice of the previously specified mineral ingredients in proper combination; (3) maturing of bonds brought about under proper conditions of temperature and pressure applied in the curing and tempering process; (4) combining in the mixture grains of a definite size and using such a quantity of them so as to provide sufficiently dense packing in which case the distance between them is such as to make provision for the shrinkage and expansion involved in drying. The precalculated volume and quantity of grains prior to maturing of the bonds by tempering must be such that after the bonds have matured the grains, the bond and the pores constitute a predetermined volume percentage under which a dense packing is secured; (5) producing a structural configuration of the components with limited porosity, applying suitable light weight and elastic fillers such as micas. The ideal composition possesses a sufficient degree of plasticity, coherence and adherence to provide a close grained mixture like that of a synthetic rock thereby preventing free transmission of oil and water. The cold setting process of the respective mineral complexes differs to a certain extent from regular setting or hardening processes involved in the case of regular ceramics and cements. In the setting process of the novel mineral aggregates the cementing process of mineral ingredients belonging to various groups and forms of crystallization together with the highly plastic type of a clay may be viewed as a complex crystallization-recrystallization process, accompanied in all probability by the formation of mixed crystals; (6) using cements especially suitable to bring about an impervious state of the mineral complexes with respect to water and oil. For example, use has been made of iron in a fine state of division like cast iron boring powders mixed with an oxidizing agent such as mineral pyrolusite ($MnO_2$) or a substance which is electronegative to iron. In the process of cementing, iron swells by forming an iron oxide and cements the mass together. It has the ability to fill all the leaks by spreading out and to maintain stability of cementing even under high temperature conditions. Fire clay in turn serves as the best cement for graphite. Carbon binders and certain types of cements prepared by mixing powdered silica or fine sand or flint with a solution of $MnCl_2$ (10%) painted or soaked into a solution of sodium silicate (30%) as well as certain bitumens, all used in moderate proportion not to damage the catalytic activity may be used to make the synthetic catalytic mineral mass impregnable to the action of oil and water. While some of the minerals making up the heterogeneous mineral complexes serve to produce better binding in the form of internal coherence of single crystalline particles to each other within the complexes, others especially those containing Zr such as zircon ($ZrO_2 \cdot SiO_2$) or zirconium sponge (Zr) or zircite ($ZrO_2$) (trade name of a cement containing Zr) have the aptitude of bringing about adherence bonds. In the case of heterogeneous mineral complexes, such type of minerals is essential since proper adherence of the catalytic mass to its metallic carrier is of major importance.

*Use of internal combustion catalysts in the form of heterogeneous mineral complexes in the internal combustion engine*

The heterogeneous mineral complexes for use as catalysts are prepared by thoroughly mixing in a dry state and in finely divided form: (1) minerals selected from the group of minerals serving as catalysts in hydrocarbon decomposition; (2) minerals selected from the group of minerals serving as catalysts in hydrocarbon dehydrogenation; (3) minerals selected from the group of minerals serving as catalysts in oxidation reactions; (4) minerals selected from the group of minerals serving as catalysts in terms of the carbonium ion mechanism; (5) minerals selected from the group of minerals serving primarily as antiknock agents; (6) preferably but not necessarily minerals selected from the group of minerals serving to contribute activation through emitted electrons i. e. thermo- and photo-luminescent minerals; and (7) minerals selected from the group of materials for imparting mechanical strength and stability to the heterogeneous complex. To this mixture is then added a sufficient quantity of water to produce a mass of proper plasticity. In this connection excess water should not be used as it serves to weaken the structure. I prefer to employ the smallest amount of water which will permit molding of the mass. With the carefully adjusted plasticity the mass is affixed to the head of a piston and/or cylinder head or any other part of the internal combustion engine. Embedded in the apertures of perforated engine parts as illustrated in the drawings, the mass is allowed to dry and tempered either in a thermo-regulated oven, heated up to 900–1100° F. or heated under high pressure or tempered for about 1–2 hours directly with the hot part of a flame from a gas burner or oxygen flame from a torch, until it has become thoroughly set. It is important to set or harden the catalyst so that it will not crack or disintegrate prior to tempering as well as during the latter. In the heat setting operation care is taken not to heat the catalytic material to such a degree that it becomes substantially fused, since this affects and substantially impairs the catalytic property of the heterogeneous mineral complexes as catalytic agents.

For a more complete understanding how the catalytic material has been applied reference is made to the accompanying drawings in which—

With more particular reference to the drawing, the invention as there illustrated comprises a piston 10 having the normal connecting rod 12 and piston rings 14 mounted for reciprocation within cylinder 16. A cylinder head 18 is provided with the normal intake and exhaust valves 20 and 22 and the normal spark plug or igniter 24. In the modification shown in Figs. 1, 2 and 3, the novel catalytic material comprising the various oxides and silicates as integral parts of heterogeneous mineral complexes is embedded directly within a plurality of concentric grooves positioned in the end wall of the piston 10. The grooves are flared inwardly in order to provide means for positively locking the catalyst therewithin. The catalyst positioned within the grooves 28 in a plastic form is thereafter allowed to harden therein so as to provide a piston surface having a plurality of exposed concentric catalyst rings. As previously indicated, the catalyst should be somewhat porous and unglazed in order to provide the desired catalytic effect.

Figure 4:
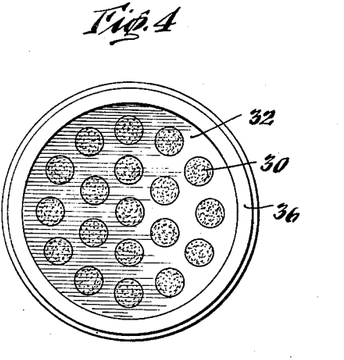
Fig. 4 is similar to Fig. 2 except that it shows a modification.
Figure 5:
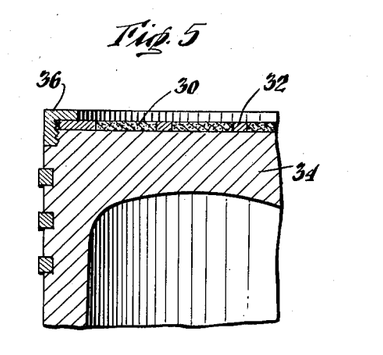
Fig. 5 is a sectional detail view of the piston shown in Fig. 4.

Another way by which the catalyst can be affixed to the end wall of the piston is demonstrated in Figs. 4 and 5. In this embodiment the plastic mineral complex catalyst is applied to and allowed to harden within inwardly relieved apertures 30 of a perforated disc 32. Thereafter the disc is clamped to the surface of a piston 34 by means of a clamping ring 36, threadably engageable with the end of the piston. This structure has some advantage in that it permits the catalyst containing discs to be removed from the end wall of the piston and replaced if desired. However, precautions should be taken to eliminate the thin layer of air between the disc and the surface of the piston head. (This has been done by using powder of graphite on account of its lubricating action.) It is, of course, apparent that other means may be provided for retaining the catalyst on the piston or any other part within the internal combustion chamber.

Figure 1:
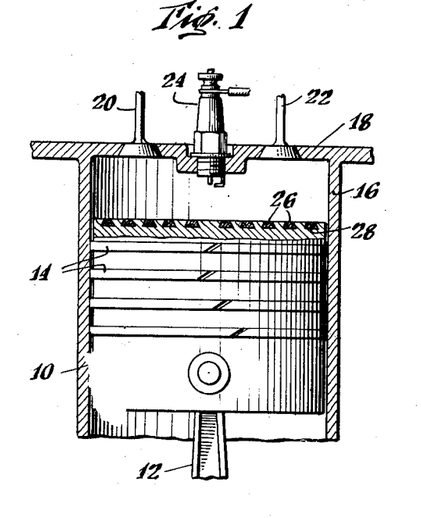
Fig. 1 is a partially schematic broken sectional view of a cylinder of an internal combustion engine including a piston element constructed in accordance with an embodiment of this invention.
Figure 2:
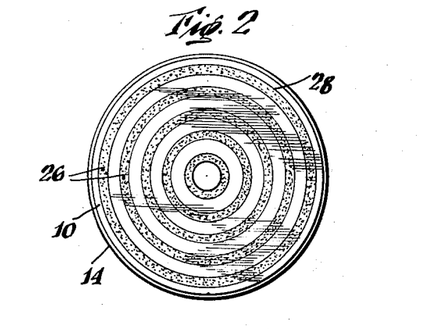
Fig. 2 is a face view of the piston shown in Fig. 1.
Figure 3:
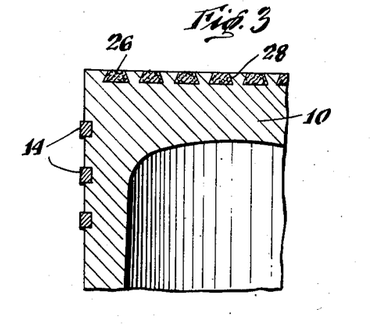
Fig. 3 is a sectional detail view of the piston shown in Fig. 1 indicating the manner in which the catalytic material has been embedded in the face of the piston.

For example the rings or grooves shown in the modification of Figs. 1 to 3 may be discontinuous if desired, thus providing a plurality of catalyst segments embedded in the piston. Likewise the catalyst may, if desired, be retained in a plurality of holes drilled in the surface of the piston, said holes being relieved toward the bottom and their walls provided with threaded rings making provision for better retention at all surfaces involved in order that the catalyst is locked permanently in place. Of course, it is apparent from the foregoing that other means may be employed for affixing the porous catalyst to any part of the interior wall of a combustion chamber. Generally it is preferred to secure the catalyst in the area of the combustion chamber where detonation normally occurs.

It may also be desirable in certain instances to have catalysts secured both to the head and to the piston and they may be either of the same or different type in composition depending upon the particular type of reactions that are desired to be catalyzed.

Positioning of oppositely acting catalytic surfaces on the cylinder head and piston head (i. e. pro-oxygen-oxidation catalysts on one and anti-oxygen catalysts or antiknocks on the other) would effect a regulation of the reaction equilibria and lead to a slowed down, normalized steady form of combustion.

The efficiency in performance of catalytic pistons with heterogeneous mineral complexes of different composition has been demonstrated in a series of tests made with a standard CFR piston or cylinder head in a standard CFR engine in accord with the CFR motor method of octane specifications.

The following are specific examples of heterogeneous mineral complexes embodying my invention, together with tests performed thereon.

EXAMPLE 1

The following minerals in dry, finely divided form are thoroughly mixed together: Argosite, 5 g. (18.5%); boric acid, 1.05 g. (3.9%); graphite, 3.75 g. (13.88%); Carborundum, 3.75 g. (13.88%); fluorspar, 3.5 g. (12.96%); muscovite, 1 g. (3.7%); (Al-steel) filings, 1 g. (3.7%); apatite, 2.5 g. (9.26%); wolframite, 2 g. (7.4%); magnetite, 2 g. (7.4%); zircon, 1 g. (3.7%); zircite, 0.5 g. (1.85%); (total amount of mixture 27.0 grams). A sufficient quantity of water is then added to the mass to permit the molding thereof.

The CFR piston in a standard engine was modified by drilling a series of 6 concentric grooves into the head of the piston. The grooves were about 1/8 inch wide and relieved as they proceeded toward the bottom of the piston. The grooves were filled with the mass of the heterogeneous mineral complex. The catalytic piston ran successfully without affecting the catalyst, for several hours under standard engine conditions and in accord with the CFR motor method octane specification.

With the standard CFR piston the fuel (straight-run gasoline) was rated at 49.5 octane number.

When the catalyst laden piston was substituted for the standard piston, the compression ratio in the CFR engine was increased to such a level as would indicate that the effective value of octane number of the fuel had been increased to 67.0. The increase which resulted from the use of the catalytic piston has been equivalent to about 18 octane number.

EXAMPLE 2

The following minerals in dry, finely divided form are thoroughly mixed together: Argosite, 5 g. (18.5%); sodium borate, 1 g. (3.7%); graphite, 3.75 g. (13.88%); Carborundum, 3.75 g. (13.58%); fluorspar, 3.75 g. (13.58%); muscovite, 1 g. (3.7%); Al filings, 0.5 g. (1.85%); apatite, 2.5 g. (9.26%); wolframite, 2 g. (7.4%); magnetite, 2 g. (7.4%); zircon, 1 g. (3.7%); carnotite, 0.5 g. (1.85%); (total amount of mixture 26.75 grams). A sufficient quantity of water is then added to the mass to permit the molding thereof.

The modified piston design was the same as in Example 1 with the exception that the outer circular grooves were divided into segments by melting into them a series of plugs of silver solder to improve the thermal conductivity of the catalyst. The run was a repetition of previous runs with the exception that a high octane number catalytically cracked gasoline has been used as a fuel.

With a standard CFR piston the octane number of this fuel was determined as 82.0.

The substitution of the catalyst laden piston permitted an increase in compression ratio with the same level of audible knock which indicated an increase in the effective octane number of the catalytically cracked gasoline to somewhat beyond 100. The compression ratio has been raised from 6.7 to 7.8. In each of the above experiments the knock level has been determined by the bounced pin knockmeter reading in accordance with the standard CFR motor method octane number procedure.

EXAMPLE 3

The following minerals in dry, finely divided form are thoroughly mixed together: Argosite, 5 g. (18.5%); boric acid, 0.8 g. (2.98%); sodium borate, 0.25 g. (0.9%); graphite, 3.75 g. (13.88%); Carborundum, 3.75 g. (13.88%); fluorspar, 3.75 g. (13.88%); muscovite, 1.00 g. (3.7%); Al filings, 0.5 g. (1.85%); apatite, 2.5 g. (9.26%); wolframite, 2 g. (7.4%); magnetite, 2 g. (7.4%); carnotite, 0.5 g. (1.85%); zircon, 1.00 g. (3.7%); (total amount of mixture 26.80 grams). A sufficient quantity of water is then added to the mass to permit the molding thereof.

A catalyst laden piston with circular grooves having 12 partitions made with silver soldered plugs was used. The catalyst remained intact after 2 hours 45 minutes run of the CFR test.

The mode of operation was altered in this test. In this instance the quality of the fuel was changed in order to achieve the same knockmeter readings with the standard piston and with the catalyst laden piston with no change whatsoever in the setting of engine variables. The standard piston was run on a 79.4 octane number blend of catalytically cracked and white gasolines. In order to achieve the same knockmeter reading when the catalyst-laden piston had been substituted for the standard CFR piston the fuel mixture required was 20% of catalytically cracked gasoline and 80% of white gasoline; the mixture having an octane number of 55.0. In other words an increase equivalent to 24.4 octane numbers resulted in use of the catalyst.

EXAMPLE 4

The following minerals in dry, finely divided form are thoroughly mixed together: Argosite, 1.25 g. (9.4%); colemanite, 0.125 g. (0.94%); graphite, 0.94 g. (7.08%); Carborundum, 0.94 g. (7.08%); potassium fluoborate, 0.35 g. (2.64%); fluorspar, 0.7 g. (5.27%); granite red, 2.0 g. (15.0%); granite gray, 1.00 g. (7.54%); flint, 0.7 g. (5.27%); lepidolite, 0.10 g. (0.754%); muscovite, 0.10 g. (0.754%); apatite, 0.75 g. (5.65%); microcline, 0.25 g. (1.8%); wavellite, 0.25 g. (1.8%); titanite, 0.25 g. (1.8%); dolomite, 1.00 g. (7.54%); wolframite, 0.25 g. (1.8%); magnetite, 0.25 g. (1.8%); willemite, 0.25 g. (1.8%); zircon, 0.55 g. (4.15%); Fe cement, 1.25 g. (9.4%); (total amount of mixture 13.26 grams). A sufficient quantity of water is then added to the mass to permit the molding thereof.

The head of the cast iron piston CFR engine has been provided with circular grooves and charged with the catalytic mass. Regular grade Socony-Vacuum motor gasoline leaded of about 80 octane number was used.

Standard CFR piston was run in the engine at 900 R. P. M.; torque 10½"; c/c min.=21; Rv (compression ratio=6.6; knockmeter mean value, 37; percent unburned fuel in exhaust, 14;

Catalytic piston run in the engine at 900 R. P. M.; torque 10½"; c/c min.=24; Rv (compression ratio)=7.63; knockmeter mean value, 25; percent unburned fuel in exhaust 14. Catalytic piston operated with less detonation at the same compression ratio or with the same detonation at a higher compression ratio than the standard piston on any given gasoline.

A standard CFR engine was used, coupled to a cradle type electric dynamometer.

A Stromberg CE-1 carburetor, boxed and connected to a displacement type air meter was used to have air flow readings.

Fuel was measured by burette and stop watch (the quantity taken for individual runs of 150 cc.).

The mixture temperature was held at 300° F. by a Malraison automatic mixture temperature control.

Exhaust products were continuously analyzed for percentage of CO during all runs.

EXAMPLE 5

The following minerals in dry, finely divided form are thoroughly mixed together: Argosite, 1.25 g. (10.4%); colemanite, 0.125 g. (1.04%); Carborundum, 0.94 g. (7.8%); graphite, 0.94 g. (7.8%); potassium fluoborate, 0.35 g. (2.91%); fluorspar, 0.7 g. (5.83%); granite (Beer's red), 2 g. (16.6%); granite (gray), 1 g. (8.3%); flint (200 mesh), 0.7 g. (5.83%); microcline, 0.25 g. (2.08%); wavellite, 0.25 g. (2.08%); titanite, 0.25 g. (2.08%); dolomite, 1.00 g. (8.3%); wolframite, 0.25 g. (2.08%); magnetite, 0.25 g. (2.08%); willemite, 0.25 g. (2.08%); zircon, 0.5 g. (4.17%); Fe cement, 1.00 g. (8.3%); (total amount of mixture 12.0 grams). A sufficient quantity of water is then added to the mass to permit the molding thereof.

A test was conducted employing a cast iron piston head with 113 small drilled holes (⅛ in diameter) undercut toward the bottom with rings cut on the inside walls to secure better adhesion of the catalyst to the metal. The catalyst in the form of the heterogeneous mineral complex was inserted in the holes. C-14 reference fuel (CRC secondary reference fuel for knock testing, unleaded (70 octane number) was used.

With standard CFR piston the following results were obtained at 900 R. P. M.; torque 10½"; c/c min.=21; Rv (compression ratio)=5.1; knockmeter mean value, 36; unburned fuel in exhaust, 13.5%.

With catalytic piston the following results were obtained at 900 R. P. M.; torque 10½"; c/c min.=30; Rv (compression ratio)=8.7; knockmeter mean value, 52; percent unburned fuel in exhaust, 13%./

EXAMPLE 6

The following minerals in dry, finely divided form are thoroughly mixed together: Argosite, 1.7 g. (13.3%); ulexite, 0.35 g. (1.9%); graphite, 1.25 g. (9.8%); Carborundum, 1.25 g. (9.8%); fluorspar, 1.17 g. (9.12%); muscovite, 0.17 g. (0.912%); lepidolite, 0.17 g. (0.912%); apatite, 0.7 g. (5.48%); wolframite, 0.7 g. (5.48%); magnetite, 0.7 g. (5.48%); zircon, 0.7 g. (5.48%); carnotite, 0.7 g. (5.48%); cryolite, 0.5 g. (3.9%); routile, 0.5 g. (3.9%); titanite, 0.5 g. (3.9%); microcline, 0.25 g. (1.95%); wavellite, 0.25 g. (1.95%); dolomite, 0.5 g. (3.9%); Fe cement, 0.7 g. (5.48%); (total amount of mixture 12.76 grams). A sufficient quantity of water is then added to the mass to permit the molding thereof.

A test was then conducted with a standard Wisconsin 3 H. P. single cylinder engine. The aluminum piston of the engine was altered by drilling 69 holes in the head thereof and filling them with the heterogeneous mineral catalyst of Example 6.

The engine was run at 1100 R. P. M. under maximum load for more than 40 hours without visible change in the catalyst surface or catalytic effect with respect to carbonization and knock.

Complete stability of the catalyst was maintained during the intervals of run of the engine and the catalytic surface was free from carbon sedimentation, which is in a sharp contrast with carbonized standard aluminum piston or aluminum piston head under identical conditions.

The absence of carbonization and decrease in knocking indicated qualitatively the catalytic activity of the catalyst used.

EXAMPLE 7

The following minerals in dry, finely divided form are thoroughly mixed together: Argosite, 1.7 g. (12.6%); potassium fluoborate, 1.35 g. (10%); graphite, 1.25 g. (9.26%); Carborundum, 1.25 g. (9.26%); fluorspar, 1.17 g. (8.66%); muscovite, 0.17 g. (0.86%); lepidolite, 0.17 g. (0.86%); apatite, 0.7 g. (5.18%); cryolite, 0.5 g. (3.71%); granite, 1.00 g. (7.31%); flint, 0.5 g. (3.71%); microcline, 0.25 g. (1.85%); tourmaline, 0.25 g. (1.85%); wavellite, 0.25 g. (1.85%); routile, 0.7 g. (5.18%); titanite, 0.5 g. (3.71%); zircon, 1.00 g. (7.31%); Fe cement, 0.79 g. (5.85%); (total amount of mixture 13.50 grams). A sufficient quantity of water is then added to the mass to permit the molding thereof.

A test was then conducted with a standard Wisconsin 3 H. P. single cylinder engine. The aluminum piston of the engine was altered by forming circular grooves in the head thereof and then filling them with the heterogeneous mineral catalyst of Example 7. The engine was then run in the same manner as in Example 6 and the same results were obtained.

EXAMPLE 8

The following minerals in dry, finely divided form are thoroughly mixed together: Argosite, 1.7 g. (14.91%); boric acid, 0.35 g. (3.07%); Calgon, 0.35 g. (3.07%); graphite, 1.00 g. (8.77%); Carborundum, 1.00 g. (8.77%); fluorspar, 1.00 g. (8.77%); muscovite, 0.15 g. (1.31%); lepidolite, 0.15 g. (1.31%); apatite, 0.7 g. (6.13%); zirconium sponge, 0.25 g. (2.19%); carnotite, 0.5 g. (4.37%); microcline, 0.5 g. (4.37%); tourmaline, 0.25 g. (2.19%); granite red, 1.00 g. (8.77%); flint, 1.00 g. (8.77%); cryolite, 0.5 g. (4.37%); Fe cement, 1.00 g. (8.77%); (total amount of mixture 11.40 grams). A sufficient quantity of water is then added to the mass to permit the molding thereof.

A test was then conducted with a standard Wisconsin 3 H. P. single cylinder engine. The aluminum piston of the engine was altered by drilling 29 holes in the head thereof and filling them with the heterogeneous mineral catalyst of Example 8. The engine was then run in the same manner as in Example 6 and the same results were obtained.

EXAMPLE 9

The following minerals in dry, finely divided form are thoroughly mixed together: Argosite, 1.6 g. (14.35%); ulexite, 0.35 g. (3.13%); Calgon (potassium sesquiphosphate), 0.25 g. (2.24%); graphite, 1.00 g. (9.8%); fluorspar, 0.75 g. (6.72%); granite (Beer's red), 1.5 g. (13.5%); flint, 0.7 g. (6.27%); lepidolite, 0.35 g. (3.13%); apatite, 0.75 g. (6.72%); titanite, 0.35 g. (3.13%); routile, 0.25 g. (2.24%); cryolite, 0.5 g. (4.49%); dolomite, 1.00 g. (8.9%); willemite, 0.5 g. (4.49%); wolframite, 0.55 g. (4.84%); zirconium sponge, 0.5 g. (4.49%); microcline, 0.25 g. (2.24%); (total amount of mixture 11.15 grams). A sufficient quantity of water is then added to the mass to permit the molding thereof.

A test was then conducted with a standard Wisconsin 3 H. P. single cylinder engine. The cylinder head of the engine was altered by drilling holes in the interior surface thereof and filling them with the heterogeneous mineral catalyst of Example 9. The engine was then run in the same manner as in Example 6 and the same results were obtained.

In each of the heterogeneous mineral complexes of Examples 1 through 9 the proportions of ingredients may be varied it being understood that the proportions at which the optimum results are obtained in each instance may be readily determined by tests of the above character. It will thus be seen that I have provided improved means for controlling combustion in an internal combustion engine in the form of a heterogeneous mineral complex containing minerals serving as catalysts in hydrocarbon decomposition, minerals serving as catalysts in hydrocarbon dehydrogenation, minerals serving as catalysts in oxidation reactions, minerals serving as catalysts in terms of the carbonium ion mechanism, minerals serving as antiknocks and preferably minerals serving to contribute activation through emitted electrons.

I claim:

1. A preparation for improving combustion in an internal combustion engine consisting substantially of a heterogeneous complex of: minerals serving as catalysts in hydrocarbon decomposition selected from the group consisting of carnotite, in the proportion of 1.85% to 5.48% by weight; fluorspar, in the proportion of 5.27% to 13.88% by weight; wolframite in proportion of 2.08% to 7.4% by weight; and zircon, in the proportion of 3.7% to 7.31% by weight; minerals serving as catalysts in hydrocarbon dehydrogenation selected from the group consisting of apatite, in the proportion of 5.18% to 9.26% by weight; magnetite ore, in the proportion of 1.8% to 7.4% by weight; and argosite, in the proportion of 9.4% to 18.5% by weight; minerals serving as catalysts in oxidation reactions selected from the group consisting of boric acid, in the proportion of 2.98% to 3.07% by weight; sodium borate, in the proportion of 0.9% to 3.7% by weight; ulexite, in the proportion of 1.9% to 3.13% by weight; colemanite, 0.94% to 1.04% by weight; minerals serving as catalysts in terms of the carbonium ion mechanism selected from the group consisting of routile, in the proportion of 2.24% to 5.18% by weight; zircon, in the proportion of 3.7% to 7.31% by weight; and the mineral graphite, in the proportion of 7.08% to 13.88% by weight; serving as an antiknock agent.

2. A preparation for improving combustion in an internal combustion engine as set forth in claim 1 in which the heterogeneous complex includes the mineral willemite, in the proportion of 1.8% to 2.08% by weight; which serves to contribute activation through emitted electrons.

3. A preparation for improving combustion in an internal combustion engine as set forth in claim 1 in which the minerals are in finely divided form and are bound together in a rock-like mass, the minerals being substantially uniformly distributed throughout the mass.

4. A preparation for improving combustion in an internal combustion engine comprising a mixture of fluorspar, in the proportion of 5.27% to 13.88% by weight; argosite, in the proportion of 9.4% to 18.5% by weight; boric acid, in the proportion of 2.98% to 3.07% by weight; zircon, in the proportion of 3.07% to 7.31% by weight; and graphite, in the proportion of 7.08% to 13.88% by weight; in finely divided form and bound together in a rock-like mass with each ingredient being substantially uniformly distributed throughout the mass.

References Cited in the file of this patent

UNITED STATES PATENTS

| | | |
|---|---|---|
| 428,747 | Eames | May 27, 1890 |
| 1,564,906 | Sokal | Dec. 8, 1925 |
| 1,631,702 | Sokal | June 7, 1927 |
| 1,631,705 | Sokal | June 7, 1927 |
| 1,657,753 | Jaeger et al. | Jan. 31, 1928 |
| 1,820,878 | Wyckoff | Aug. 25, 1931 |
| 1,880,209 | Moses | Oct. 4, 1932 |
| 2,079,854 | Hartshorne | May 11, 1937 |
| 2,552,555 | Houdry | May 15, 1951 |

OTHER REFERENCES

Text: "Catalysts," Berkman, Morrell and Egloff; Reinhold Pub. Co., 1940, pages 656–660 (Table 1).